United States Patent
Jensen

(10) Patent No.: US 10,043,089 B2
(45) Date of Patent: Aug. 7, 2018

(54) PERSONAL IDENTIFICATION METHOD AND APPARATUS FOR BIOMETRICAL IDENTIFICATION

(71) Applicant: Bettina Jensen, Hamburg (DE)

(72) Inventor: Bettina Jensen, Hamburg (DE)

( * ) Notice: Subject to any disclaimer, the term of this patent is extended or adjusted under 35 U.S.C. 154(b) by 92 days.

(21) Appl. No.: 15/064,935

(22) Filed: Mar. 9, 2016

(65) Prior Publication Data

US 2016/0267340 A1    Sep. 15, 2016

Related U.S. Application Data

(60) Provisional application No. 62/131,694, filed on Mar. 11, 2015.

(51) Int. Cl.
*G06K 9/00* (2006.01)
*G06K 9/32* (2006.01)

(52) U.S. Cl.
CPC ....... *G06K 9/3208* (2013.01); *G06K 9/00288* (2013.01); *G06K 9/00885* (2013.01)

(58) Field of Classification Search
CPC ........... G06K 9/00885; G06K 9/00288; G06K 9/3208
See application file for complete search history.

(56) References Cited

U.S. PATENT DOCUMENTS

| | | | | |
|---|---|---|---|---|
| 3,648,240 A * | 3/1972 | Jacoby | ............... | G06K 9/00013 340/5.52 |
| 6,317,544 B1 * | 11/2001 | Diehl | ................... | G06F 21/313 283/69 |
| 6,393,139 B1 * | 5/2002 | Lin | ....................... | G06F 21/316 382/124 |
| 6,404,904 B1 * | 6/2002 | Einighammer | ........... | G01J 4/00 356/71 |
| 6,522,772 B1 * | 2/2003 | Morrison | ............. | G06Q 20/208 235/383 |
| 6,961,450 B2 * | 11/2005 | Takhiri | ............... | G06K 9/00382 340/5.81 |
| 2006/0056662 A1 * | 3/2006 | Thieme | .............. | G06K 9/00067 382/115 |
| 2007/0197261 A1 * | 8/2007 | Humbel | ................. | G06Q 30/00 455/558 |
| 2014/0162598 A1 * | 6/2014 | Villa-Real | ............... | H04M 1/66 455/411 |

(Continued)

FOREIGN PATENT DOCUMENTS

| | | |
|---|---|---|
| EP | 0972267 | 10/2002 |
| FR | 2754369 | 10/1998 |

*Primary Examiner* — Mia M Thomas
(74) *Attorney, Agent, or Firm* — ZIP Law PLLC

(57) ABSTRACT

Identification systems comprising methods and apparatus, including computer programs encoded on a computer storage medium on digital and mobile devices, for determining a person's identity based on biometric characteristics of a person's hand or face using dimensions of a full-scale object from within at least one image of the person's hand or face. The method and apparatus of the present invention may be used to protect against identity theft in performing financial transactions, and to prevent unauthorized access to computer systems, mobile devices, web sites, and any premises either in banks, businesses and other organizations dealing with confidential information.

22 Claims, 17 Drawing Sheets

(56) References Cited

U.S. PATENT DOCUMENTS

| | | | |
|---|---|---|---|
| 2014/0376879 A1* | 12/2014 | Yoshida | G06K 9/00 386/230 |
| 2015/0221151 A1* | 8/2015 | Bacco | G07C 9/00158 340/5.83 |
| 2015/0371403 A1* | 12/2015 | Koyama | G06T 7/2093 382/103 |
| 2016/0012280 A1* | 1/2016 | Ito | G06K 9/00288 382/305 |

* cited by examiner

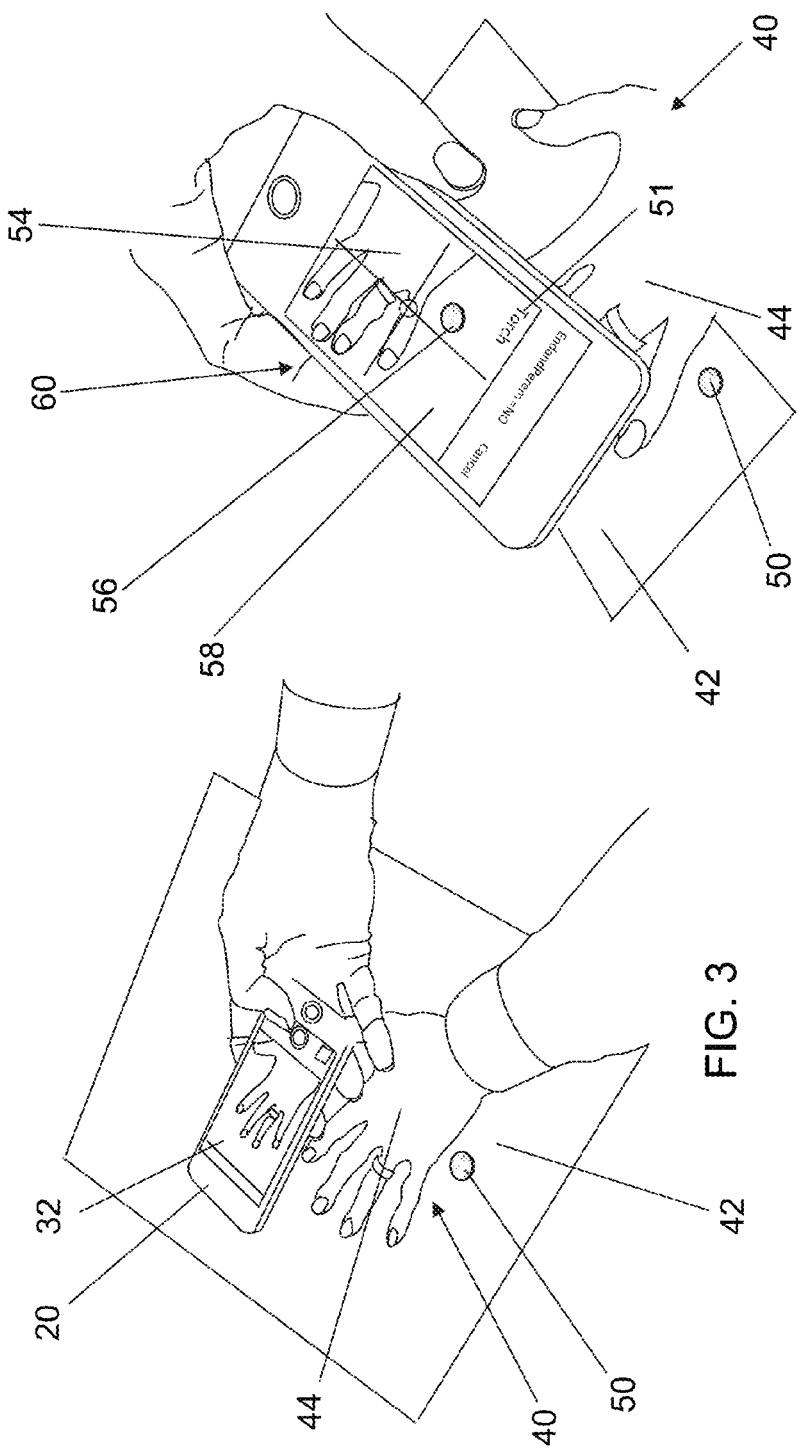

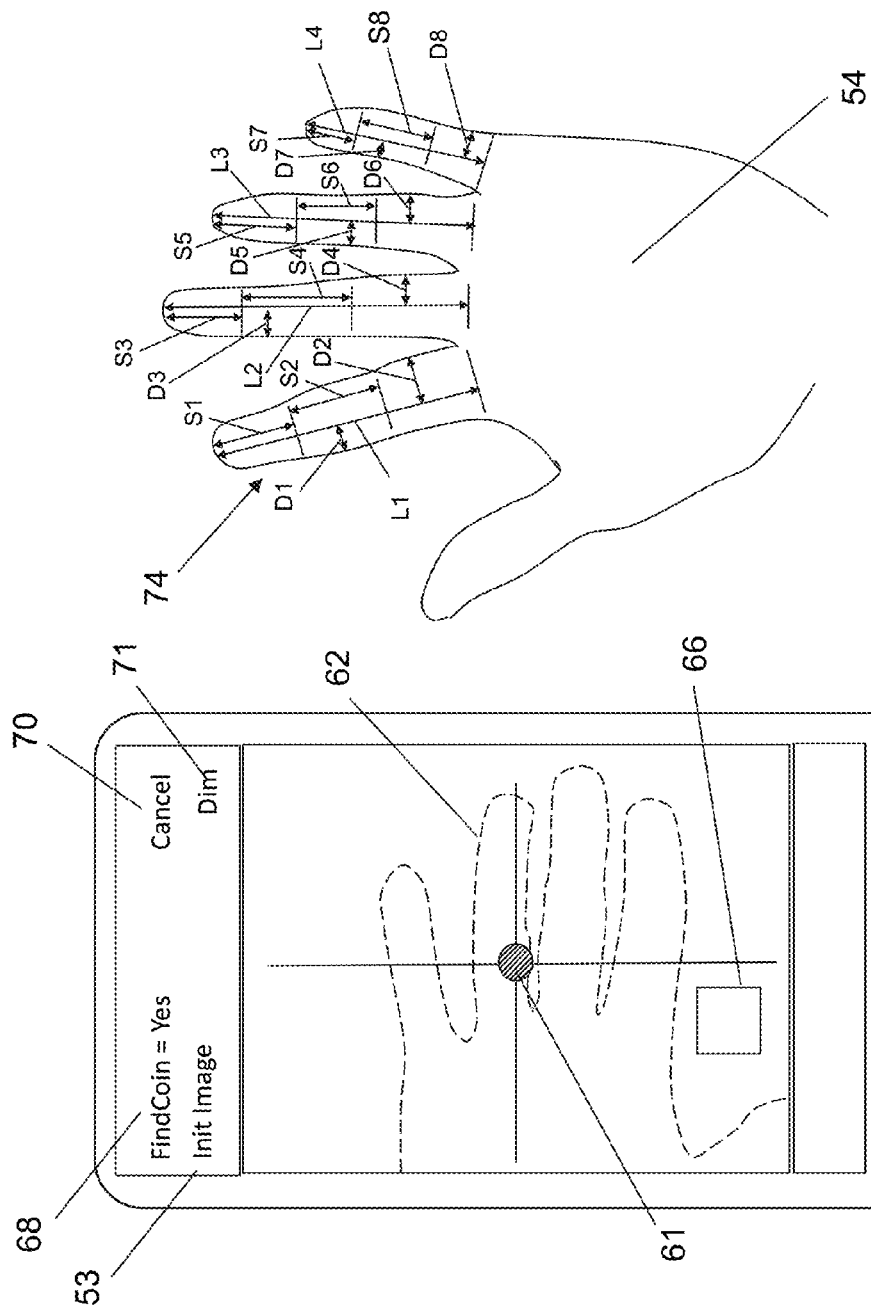

PERSONAL IDENTIFICATION METHOD AND APPARATUS FOR BIOMETRICAL IDENTIFICATION

This application claims the benefit of U.S. Provisional Patent Application No. 62/131,694 filed Mar. 11, 2015 entitled PERSONAL IDENTIFICATION METHOD AND APPARATUS FOR BIOMETRICAL IDENTIFICATION which is hereby incorporated herein by reference in the entirety.

FIELD OF THE INVENTION

The present invention is related to digital and mobile device-based identification methods, systems, and apparatus, including computer programs encoded on a computer storage medium, for determining a person's identity based on biometric characteristics of a person's hand or face using the dimensions of a full-scale object presented within an image of the person's hand or face. The method and apparatus of the present invention may be used to protect against identity theft in performing financial transactions, and to prevent unauthorized access to computer systems and other digital devices, web sites, and any premises either in banks, businesses and other organizations dealing with confidential information.

BACKGROUND OF THE INVENTION

A variety of distinctive measurable biometric characteristics may be used to authenticate a person's identity which may be used to allow access to a secure location, to validate a financial transaction, to confirm a command related to for example military operations, or to perform other activities. Personal identification systems may compare physiological characteristics which may include DNA, fingerprints, face recognition, the veins of the palm, a palm print, iris recognition, and hand geometry. These means of identification are in some cases reliable because of the uniqueness of each of these characteristics to a specific individual. However, the accuracy of identification is limited by the precision of the apparatus used and the identification methodology employed. Commonly, identification methods may develop digital templates encoded from features of acquired patterns and images based on the physical characteristics of a person. Using statistical algorithms and iterative comparisons of these features a narrowing of probabilities may be found to establish an accurate match for verification. For example, U.S. Pat. No. 6,317,544 specifies a distributed biometrical identification system that receives input of biometrical data such as fingerprint and photographic data and links this information with remote file servers within the identification system to compare the biometrical data with stored biometrical data in order to determine a person's identity. In FR Patent No 2754369, a method and apparatus for personal identification by measuring hand configurations and comparing this measurement to previously measured stored parameters is disclosed. The use of hand geometry is also described in U.S. Pat. No. 6,961,450 that discloses a user identification method that uses a sensor to identify the presence of living matter and an optical system that reflects light from a person's hand onto a mirror and a 50% mirror. The mirrors within the optical system then reflect the light to a photo receiver (CTD matrix) that is optically mated with the surface of the hand and thus the contour of the hand is scanned and captured on the CTD matrix. The CTD matrix has a known number of matrix elements, and the signal from each matrix element is converted into a digital mode and entered in a frame memory unit. An image of the person's hand is scanned and the number of CTD matrix elements are used to calculate the hand geometry. The calculated hand geometry is converted into an identification code that is stored and compared to a scanned image of the hand and calculated hand geometry obtained at a later time. A person may be identified if the later obtained identification code is within an acceptable error rate of the stored identification code. The described optical system is very specialized equipment that must be properly maintained to align the mirrors and CTD matrix to reduce distortion and ensure that a person is properly identified. In contrast to these approaches embodiments of the present invention do not require specialized identification equipment, and instead provide a precision method for the identification of a person using a mobile device having a camera and the dimensions of a full-scale object as described herein.

SUMMARY OF THE INVENTION

The present invention is a digital and mobile device based biometric identification system and method to identify a person based on the biometric characteristics of a person's hand in a preferred embodiment or a person's face in further embodiments of the present invention. The biometric identification method and system is unique in that the physical geometry of the biometric characteristics are determined using a full-scale object having known dimensions that is within a captured image of the person's hand or face. The biometric identification method and system may be in the form of an apparatus such as a mobile device having a camera and capable of accessing a biometric identification system database for verification of a person's identity. In other embodiments, the biometric identification system may be implemented as a digital device available with an automated teller machine, a self-service machine, a parking machine, a cash register, a metal detector or within other security devices such as equipment used in financial institutions, airports, government buildings, or at other locations. The biometric identification system may further be implemented as a handheld command authorization device to be used in military applications; or be implemented with a locking mechanism for access to a bank vault, safe or lock box, or on a door or gate at a secure location to prevent unauthorized personal from entering. The simplicity and ease of use of the biometric identification system including the implementation of the acquisition of biometric data using a mobile device and verification of the identity of a person in only a few seconds using a local or remote access to a verification database makes the present invention well suited for integration with any number of security models, systems and devices.

The biometric identification system may be implemented as a mobile app or other software application on a computer, mobile device, or other digital device. A biometric template is developed using encrypted algorithms and biophysical features and characteristics derived from the measurements of the physical geometry of a person's hand or face. The encrypted algorithms may store the biophysical features and characteristics as one or more identification codes that are accessible through the biometric template. In an initialization step, a user interface provides for a user to register a biometric template within a command center or other facility capable of storing a verification database. The verification of the identity of the person is performed through a precise matching of the registered biometric template to a newly acquired biometric template. The registered and newly acquired biometric templates are prepared through the capture of a series of images of the person's hand or face taken in rapid succession at the point in time when a user is either registering their identity with a biometric identification system through the development of a registered biometric template or a user is validating their identity using a newly acquired biometric template. The biometric template may be registered for example with a command center that may manage information for a financial institution, a retail store, a government agency, or other facility that requires valid identification. The person's identification may be validated when a user is performing for example a secure financial transaction, accessing a secure location, or preforming another activity that requires valid identification.

The registered or newly acquired biometric template is created through an analysis that is performed on newly acquired images. The newly acquired images are taken of the person's hand or face with a full scale object having known dimensions. For example, a newly acquired image may be taken of a person's hand with the full scale object close to the persons' hand without overlapping or shadow the full scale object. The known dimensions of the full-scale object within the series of newly acquired images are entered into the biometric identification system and a determination of actual measurements of the geometry of the biometric features of, for example, a person's hand or face is made. These measurements are used by the biometric identification system to construct two dimensional (2D) and/or three dimensional (3D) virtual models of the biometric features and a set of dimensional relationships of the biometric features of the person's hand or face. These dimensional relationships are based on parameters defined by processing algorithms of the biometric identification software. Using the parameters and the 2D or 3D virtual model, one or more identification codes are developed that are electronically coded to be stored in a compressed format as a registered biometric template or as a newly acquired biometric template. In the registered biometric template, the series of images may also be stored to be used to develop and define the parameters that may be transmitted at the time of acquiring the newly acquired biometric template to create the identification codes from the series of newly acquired images. The newly acquired biometric template may be readily transmitted and compared against the registered biometric template to verify the identification of a person based on these one or more identification codes calculated from these parameters. In embodiments of the present invention, the series of newly acquired images are not stored permanently on the digital or mobile device but instead are deleted after each newly acquired biometric template is created. The newly acquired biometric template is time stamped and tagged when submitted preventing a template from being reused for identification at any point of time in the future.

The biometric identification system may be implemented in one or more software applications through instructions in computer readable mediums to transform, transmit and receive data. In embodiments a software application of the biometric identification system may control a camera on the digital or mobile device to capture the series of images. The person looks into the camera or places their hand face down and positions a full-scale object such as a coin near to their hand or face so that the images are captured with either the person's hand or face with the full-scale object. Through a series of spectral analysis and color gradient processes implemented within embodiments of the software application of the biometric identification system using a microprocessor, memory and data storage on the digital or mobile device, the geometric borders of the person's hand or face and of the full-scale object are separated from the background of the image. Using the dimensions of the full scale object that may be previously stored within data storage of the digital or mobile device and be accessible to the software application or that may be entered using a user interface within the software application, a reference element is derived that scales the image to the accurate dimensions of the full-scale object. The reference element is then used as a gauge to measure features and determine actual dimensions of the geometry of the person's hand or face within the series of images to develop a 2D or 3D virtual model that is encoded as the biometric template. By using the reference element, precise biometric measurements are taken and are used to develop the registered and newly acquired biometric templates of the hand or face geometry that are unique to any particular person and that may be used to effectively confirm the identification of a person. The biometric measurements may be measured at specific locations along the contours of the hand or face. Processing algorithms may be used to create one or more identification codes related to different ratios of measured parameters. The identification codes are converted to one or more 2D or 3D virtual models to be accessible for comparison through the biometric template, the encrypted template providing a key to the processing algorithms used to develop the identification codes.

The first biometric template submitted becomes the registered identification template that is associated within one or more databases of a command center of a biometric identification system. The biometric template may be stored with the series of images and may be associated with the name, address, telephone number or other identifying information about the identity of the person. To verify the identity of the person a library of registered biometric templates is accessed from the secure server structure of the command center and a comparison of a newly acquired biometric template to the library of registered biometric templates is made. Because the registered and newly acquired biometric templates are in a compressed encoded format, the comparison is performed in fractions of seconds and notification is immediately provided once a precision match is determined. With minimal time and effort confirmation of identity can be provided at the point in time when verification of identity is needed.

It is an object and advantage of the present invention to provide a biometric identification system using one or more software applications that may be implemented on any digital or mobile device.

It is an object and advantage of the present invention to provide a biometric identification system that may be implemented on a server system of computers or other digital or mobile devices connected through a wireless or wired internet or intranet connection.

It is another object and advantage of the invention that the biometric identification system prevents misidentification by requiring newly acquired time stamped images that are used only once for verification of the identity of a person.

It is another object and advantage of the invention that the biometric identification system uses an object of known dimension to determine precise unit measurements of the geometry of biometric characteristics of a person's hand or face in order to effectively validate the identity of a person or identify a person that is misrepresenting this identity.

It is another object and advantage of the invention that the biometric identification system constructs a two dimensional or three dimensional virtual model of the biometric features and relationships of the biometric features to be used to develop a biometric template.

It is another object and advantage of the invention that the biometric identification system develops the biometric template as an electronic code that is compressed to be easily transmitted to a command center for comparison to a registered biometric template.

It is another object and advantage of the invention that the application software of the biometric identification system captures a series of images in rapid succession to construct the two dimensional or three dimensional virtual model.

It is another object and advantage of the present invention that software applications of the biometric identification system access tilt sensor information from the digital or mobile device and provide an orientation indicator and cross point to indicate zero deflection in the X, Y, and Z axes to reproducibly align the camera lens when capturing the series of images.

It is another object and advantage of the present invention that the biometric identification system be implemented with an automated teller machine, a self-service machine, a parking machine, a cash register, a metal detector or within other security equipment used in financial institutions, airports, government buildings, or at other locations.

It is a further object and advantage that the biometric identification system may further be implemented as a handheld command authorization device to be used in military applications.

It is a further object and advantage that the biometric identification system be implemented with a locking mechanism for access to a bank vault, safe, lock box, or a secure location to prevent unauthorized personal from entering.

The present invention is related to a biometric identification system, comprising a software application implemented on a microprocessor, memory and data storage of a digital device, the software application comprising image capture controls; a dialog box for the entry of the dimensions of a full-scale object; a reference element derived from the full scale object; a biometric template; and wherein the reference element is applied to at least one image having a person's hand or face and the full-scale object to determine actual dimensions of the geometric features of the hand or face; the actual dimensions of the geometric features are converted to a biometric template to be used for the identification of a person. The software application of the biometric identification system may comprise spectral analysis components. The software application of the biometric identification system may comprise gradient analysis components. The software application of the biometric identification system may comprise photographic enhancement components. The biometric identification system may comprise a three dimensional virtual model constructed from the actual dimensions of the geometric features of a person's hand or face. The software application of the biometric identification system may comprise a dialog box to enter the identification of the person. Image capture controls of the software application of the biometric identification system may operate at least one camera of the digital device. The biometric identification system may comprise a database for storing at least one biometric template. The biometric identification system may comprise an identification verification component to access the database to match a biometric template with a newly acquired biometric template to verify the identification of a person. The newly acquired biometric template may be time-stamped in order to use the newly acquired biometric template only once in a comparison with the biometric template within the database. The software application of the biometric identification system may comprise an orientation indicator that accesses tilt sensor data from the digital device to reproducibly align the camera lens by adjusting the orientation indicator to align on a cross point of a horizontal axis and a vertical axis.

The present invention is related to a method of verifying the identification of a person, comprising acquiring at least one image of a person's hand or face, the at least one image including a full-scale object; acquiring the dimensions of the full-scale object; deriving a reference element from the dimensions of the full-scale object; scaling the at least one image to the reference element to determine the actual dimensions of features of the person's hand or face within the at least one image; determining the geometric dimensions of the person's hand or face; developing a biometric template from the determined geometric dimensions of the person's hand or face. The method of verifying the identification of a person comprising constructing a virtual model of a person's hand or face from the actual geometric dimensions of features of the person's hand or face within the at least one image. The method of verifying the identification of a person comprising defining parameters calculated from relationships of the geometric dimensions of the person's hand or face and storing these parameters within the biometric template as at least one identification code. The method of verifying the identification of a person comprising storing at least one biometric template in a database. The method of verifying the identification of a person comprising developing a newly acquired biometric template from at least one newly acquired image. The method of verifying the identification of a person comprising comparing the newly acquired biometric template to at least one stored biometric template to determine a precision match and verify the identification of a person. The method of verifying the identification of a person comprising storing at least one biometric template in a database within a command center. The method of verifying the identification of a person comprising accessing tilt sensor data from a digital device, displaying an orientation indicator on a display screen of the digital device based on the tilt sensor data, moving the digital device to align the orientation indicator on a cross point of a horizontal axis and a vertical axis within the display screen, capturing an image when the orientation indicator is on the cross point indicating the deflection of the digital device in the X, Y and Z axes is zero.

The present invention is also related to a computer readable medium for instructions for a biometric identification system, comprising instructions for operation of a camera on a mobile device to capture an image of a user's hand or face with a full-scale object within the image, instructions for receiving the dimensions of the full-scale object, instructions for deriving a reference element from the dimensions of the full scale object, instructions for measuring the geometry of a person's hand or face within the image using the reference element, instructions for defining at least one parameter from measurements of the person's hand or face within the image using the reference element, instructions for generating at least one identification code from the defined parameters, instructions for generating at least one biometric template from the at least one identification code instructions for determining the identification of a person from a comparison of at least one biometric template to another biometric template.

These and other features, advantages and improvements according to this invention will be better understood by reference to the following detailed description and accompanying drawings.

BRIEF DESCRIPTION OF THE DRAWINGS

Several embodiments of the present invention will now be described by way of example only, with reference to the accompanying drawings in which:

FIG. 3 is an embodiment of a camera on a mobile device operated using a biometric identification mobile app or software application in embodiments of the biometric identification system of the present invention;

FIG. 4 is an embodiment of capturing the series of images for biometric identification using a camera operated using a biometric identification mobile app or software application in embodiments of the biometric identification system of the present invention;

FIG. 7A is an embodiment of processing the captured series of images using a biometric identification mobile app or software application in embodiments of the biometric identification system of the present invention;

FIG. 7B is an embodiment of a diagrammatic representation of geometric points of measurement that may be used in processing the captured series of images to develop one or more identification codes to be used in a biometric template in embodiments of the biometric identification system of the present invention;

DETAILED DESCRIPTION OF THE INVENTION

Figure 1:
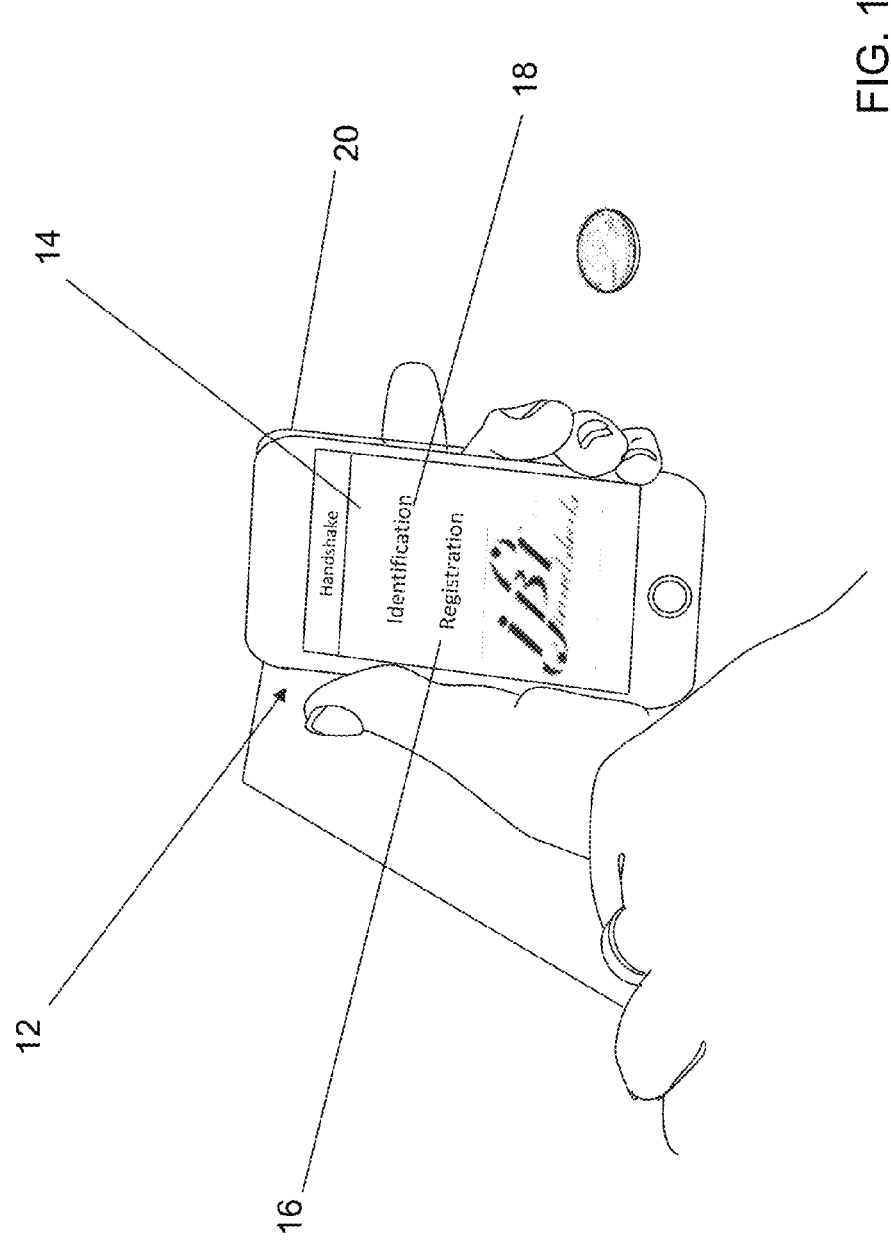
FIG. 1 is an embodiment of an identification screen on a mobile device to provide access to an embodiment of the biometric identification system using a biometric identification mobile app or software application of the present invention.
Figure 2:
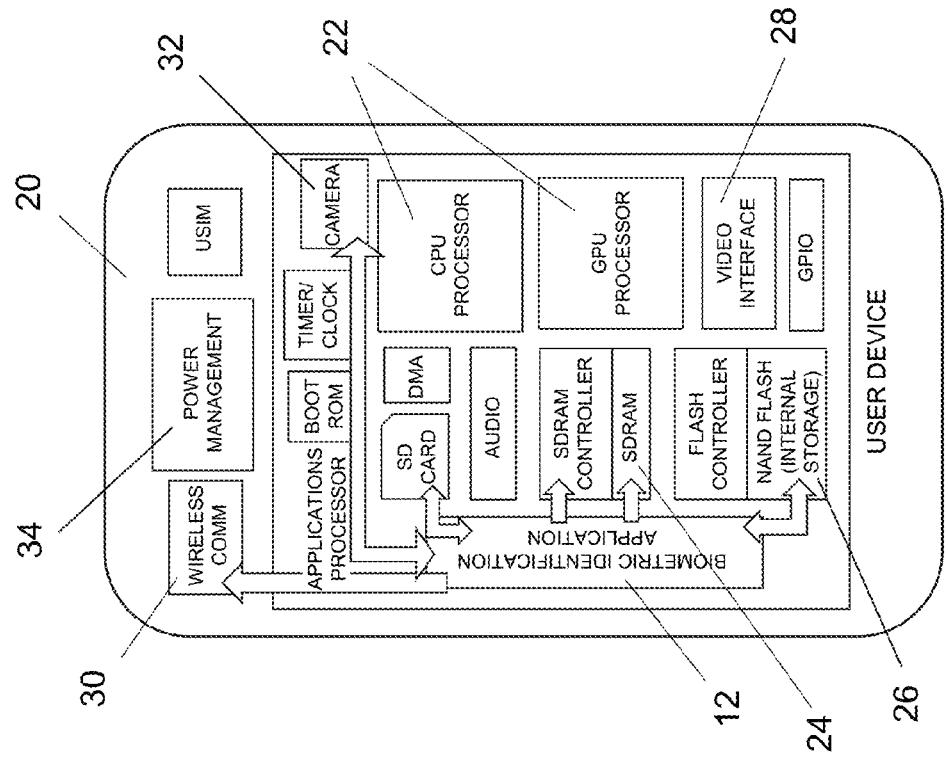
FIG. 2 is an embodiment of a mobile device for implementation of an embodiment of the biometric identification system using a biometric identification mobile app or software application of the present invention.

As shown in FIG. 1, the biometric identification system 10 may in some embodiments be implemented on a digital device using a mobile app or other software application which may be referred to herein as a biometric identification mobile app or software application 12. Within the biometric identification mobile app 12, an access screen 14 that is fairly straight forward is provided with options accessible to the user to create a registration 16 of their identification or to verify their identification 18 in order to validate a financial transaction, provide authorized access to a computer system, a mobile device, a software application and/or a website, or to disengage a locking mechanism and enter a secure location. The biometric identification system 10 is operable on any mobile device such as cellular phones, smartphones, iPhones, iPads or tablet computers or on any other digital device having computer hardware and computerized equipment such as laptops and desktop computers. In some embodiments as shown in FIG. 2, the biometric identification software application 12 may be implemented on a mobile device 20 that may have one or more processors 22, memory 24, data storage 26, video display interface 28, wireless communications interface 30, a camera 32 as well as power management 34 and other features for normal operation of the mobile device 20. The wireless communications interface 30 may transmit data from the biometric identification software application 12 using Bluetooth, Wi-Fi or another type of wired or wireless network interface supported by the mobile or other digital device.

In an initialization step a new user or a user wishing to update their identification must register their identity by creating a biometric template. The user as described herein takes one or more pictures of their hand 40 with a full-scale object 50. The full scale object has known dimensions that may be of a consistent standard size such as a coin. The biometric identification software application 12 performs a series of steps in analyzing the one or more images to create a two dimensional (2D) or a three dimensional (3D) virtual model to be used in a biometric template. The user then enters their identification information and the biometric template is stored within a database of the biometric identification system 10. While the database maybe locally stored on the mobile device, preferably the database is remote and accessible through a wired or wireless connection. The information entered by the user for their identification is encrypted and preferably securely transmitted without storing any identifying information locally on the mobile device. After selecting the registration option 16 from the access screen 14, the biometric identification software application 12 activates the camera 32 on the mobile device 20 and the user places their hand 40 on a flat surface 42 for the camera 32 to capture a series of images preferably of the back 44 of the user's hand 40. The series of images are captured in rapid succession and one or any number of pictures may be taken to be used to construct the virtual model and biometric template. The number of pictures taken may be based on light levels, background colors, or other conditions that may be evaluated and corrected for using photographic enhancement features of the biometric identification software application 12 that may adjust for example the focal point, lighting and contrast when taking the series of images.

Within the picture of the user's hand 40, the full-scale object 50 must be positioned in close proximity to but not in any way overlapping with the user's hand 40, as shown in FIG. 3. The full-scale object 50 may be positioned on either side of the hand 40 and either the left or the right hand may be used to create the biometric template, and the same hand must then be used for verification of identity. The surface 42 where the picture is taken may be of any color and be a light or dark surface with any necessary corrections to surface textures or lighting are provided using the photographic enhancement features of the biometric identification software application 12. The biometric identification software application 12 may further provide a torch lighting feature 51 to properly illuminate the person's hand 40 and the full-scale object 50. In further embodiments, the mobile device 20 or other digital device with the biometric identification software application 12 may have two cameras and other sources of light to improve the quality of the series of images for better accuracy in constructing the 2D or 3D virtual model. The biometric identification software application 12 captures an image 60 that includes an image of the hand 54, an image of the full-scale object 56 and the image background 58. In some embodiments, control features for the camera 32 of the biometric identification software application 12, may rotate the image to the horizontal or landscape mode, as shown in FIG. 4. The image is stored preferably locally on the mobile device 20 or may be transmitted to a verification database for processing.

Figure 5:
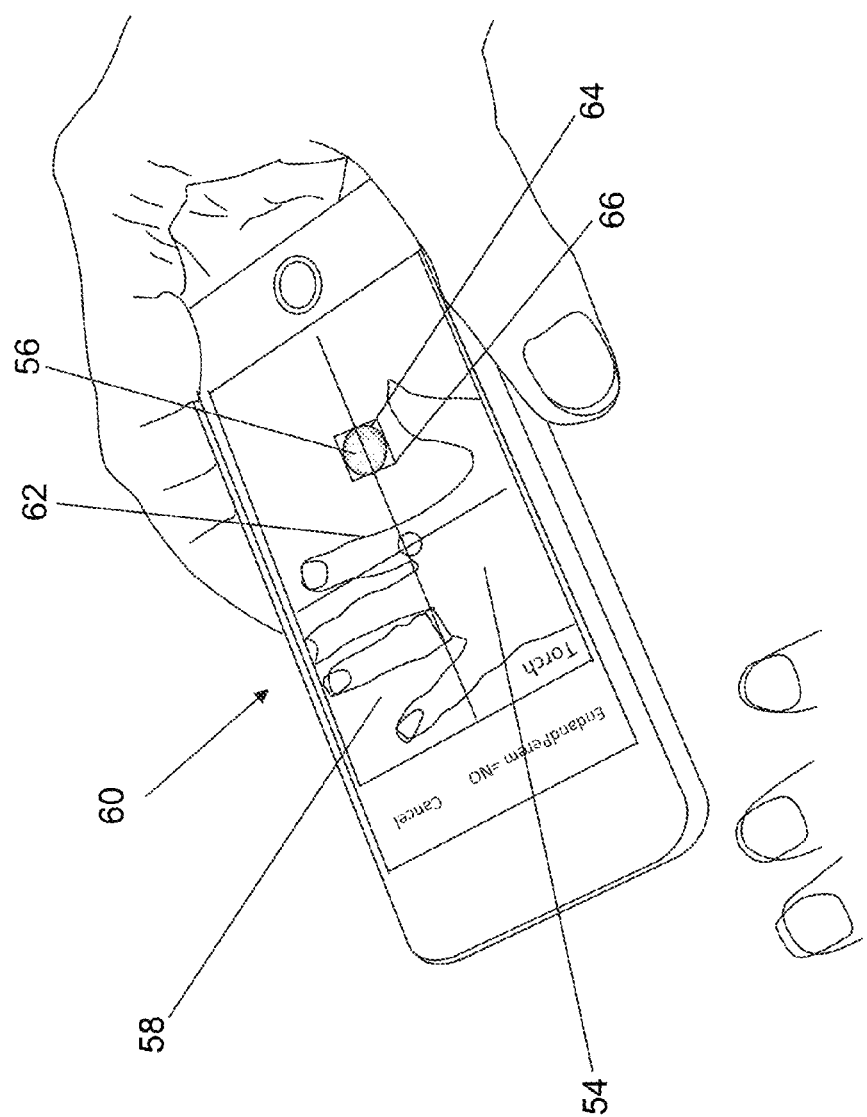
FIG. 5 is an embodiment of processing the captured series of images using a biometric identification mobile app or software application in embodiments of the biometric identification system of the present invention.

In processing an image 60 from the series of images, as shown in FIG. 5, the biometric identification software application 12 uses spectral analysis algorithms such as a color gradient analysis to differentiate and separate the image of the hand 54 of the user from the image background 58 in order to enhance the border 62 between the hand image 54 and the image background 58. A color gradient analysis or other spectral analysis algorithms used by the biometric identification software application 12 also separate the image of the full-scale object 56 from the background 58 to define a border 64. Once the border 64 of the full-scale object 56 is defined, square 66 around the image of the full-scale object 56 to develop the reference element.

Figure 6A:
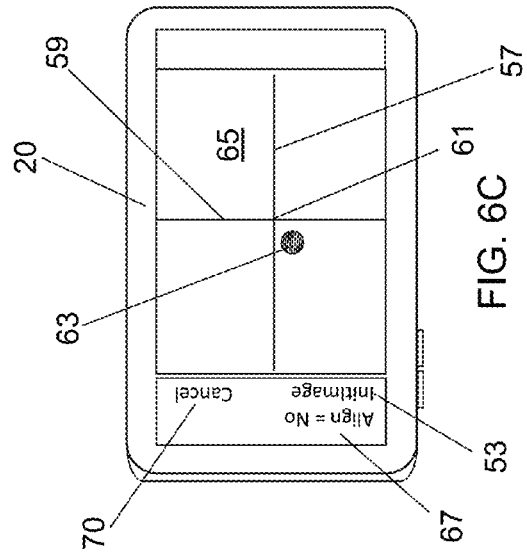
FIGS. 6A-6F are embodiments of an alignment process to control the orientation of the camera when capturing the series of images using a biometric identification mobile app or software application in embodiments of the biometric identification system of the present invention.

In some embodiments as described herein, the biometric identification system 10 may use a camera that is mounted in a fixed position with a full-scale object also mounted in a fixed position on the surface where the person will place their hand on to have images taken or where the person will stand in front of to have images taken of the person's face. By having the camera in a fixed position and using proper lighting any distortion from misalignment of the camera to the surface is minimized. In other preferred embodiments, images may be taken using any mobile device that has a camera providing for identity verification at any time and in any environment having an accessible wired or wireless connection to a command center having a verification database. The biometric identification software application 12 provides an important feature that allows the camera to be properly oriented to reduce any image distortion. The biometric identification software application 12 uses positioning algorithms that access data from tilt sensors on a mobile device that use accelerometers to determine the orientation of the mobile device within spatial axes in the x, y, and z directions. As shown in FIG. 6A, by selecting initialize image 53 the camera alignment feature 55 is shown. The camera alignment feature 55 displays a horizontal axis line 57 and a vertical axis line 59 forming a cross as an overlay to the display 65 shown through the lens of the camera 32. Using the positioning algorithms and measuring the change in capacitance from the accelerometers of the mobile device, the cross point 61 is determined on the display based on a zero deflection point in the X axis, the Y axis, and the Z axis. The camera alignment feature 55 also displays an orientation indicator 63 that may be in the form of a circle or dot, a square or any other shape. The horizontal and vertical axis lines 57 and 59 and the orientation indicator 61 may be in a bright color such as red to easily differentiate the axis lines 57 and 59 and the orientation indicator 63 from the image seen through the camera lens.

Figure 6B:
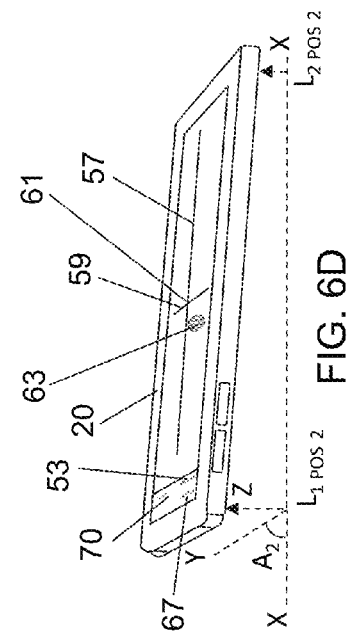
Figure 6C:
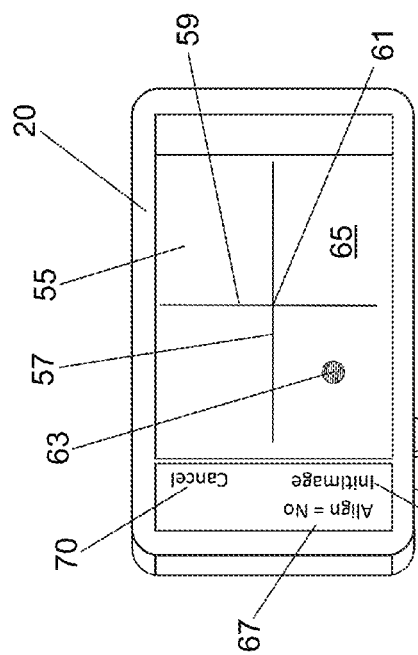
Figure 6D:
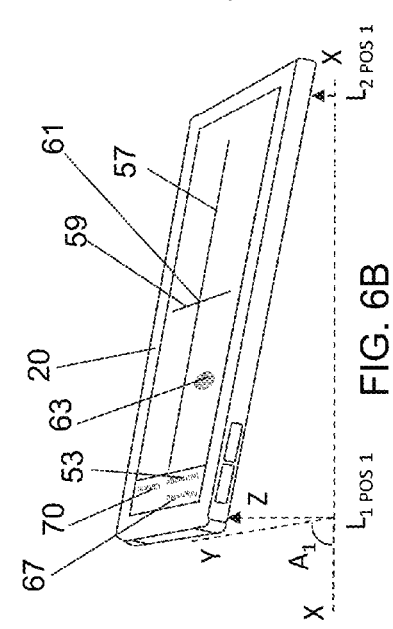

Preferably the orientation indicator 63 has an initial color and a secondary color that indicates correct alignment of the mobile device 20. As shown in FIG. 6A, the mobile device 20 is in a first position that has a greater than zero deflection from the X, Y and Z axes. As shown in FIG. 6B, in the first position the mobile device 20 is tilted up along the Z axis and slanted in the Y axis at one end along deflection angle $A_1$ from the X axis causing the distance $L_1$ from the X axis to be greater than the distance $L_2$ from the X axis. In a second position, as shown in FIG. 6C, the orientation indicator 63 is closer to the cross point 61 and as shown in FIG. 6D in the second position there is a smaller angle of deflection $A_2$ along the Y axis than the angle of deflection $A_1$ in the first position. The distance $L_1$ along the Z axis and from the X axis is shorter than the distance $L_1$ in the first position of the mobile device 20 which as shown by the orientation indicator 61 is closer in alignment to zero deflection in all three of the X, Y and Z axes. Within the camera alignment feature 55, the further the orientation indicator 63 is from the cross point 61 the greater the deflection of the mobile device 20 from the zero deflection point in the X, Y and Z axes. An alignment indicator 67 may provide a message, flash or give an audible sound indicating a closer or further distance from the cross point 61 and may provide a confirmation that the orientation indicator 61 is aligned on the cross point 61 and an image or a series of images may be taken preferably automatically using camera control algorithms providing instructions to the mobile device camera 32 as part of the biometric identification software application 12. The user may exit the camera alignment feature 55 by selecting a cancel or exit option 70 available within the display.

Figure 6F:
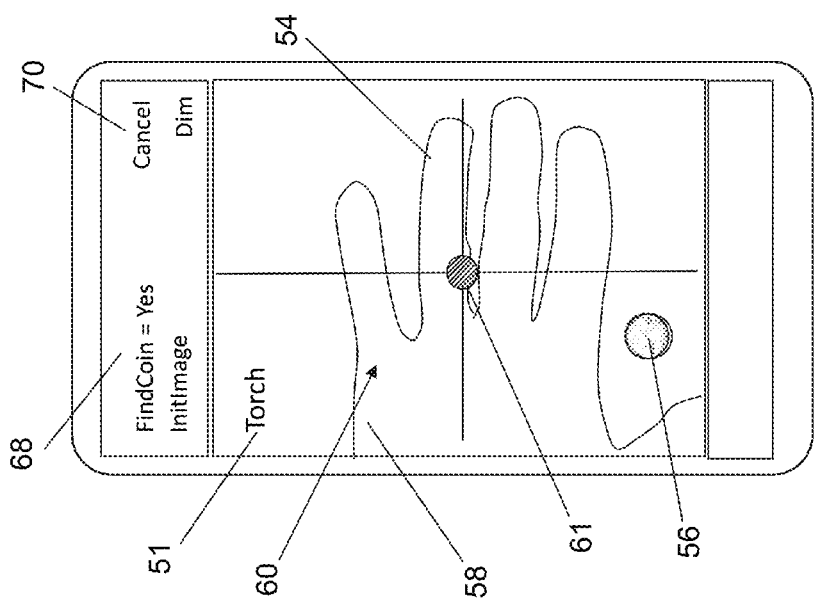
Figure 6E:
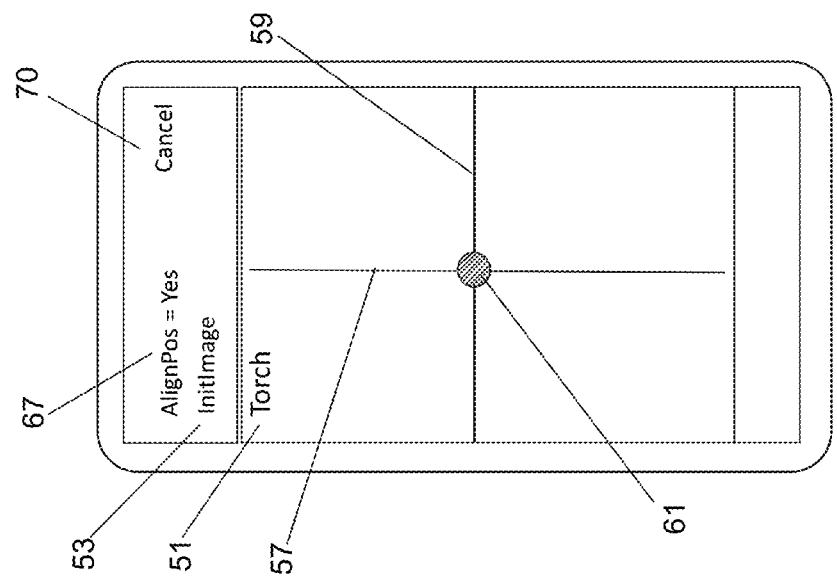

As shown in FIG. 6E, when the orientation indicator 63 is directly on the cross point 61 the camera lens is perpendicularly aligned to a flat vertical or horizontal surface 42 and a picture or series of pictures may be taken. In preferred embodiments, the orientation indicator 61 changes color from red to green for example and the alignment indicator 67 may change a message from No to Yes indicating that the mobile device 20 is properly aligned and a picture or series of pictures may automatically be taken. By positioning the camera angle using the camera alignment feature 55 distortion within the image is minimized. The Cancel option 70 or other controls may be selected to stop the image processing and retake a series of images. The biometric identification software application 12 may further provide an indicator 68 with a message such as Find Coin to indicate that the full-scale object 56 has been located within the image as shown in FIG. 6F. The biometric identification software application 12 will then begin processing the image of the user's hand 54 to separate the four fingers 74 and full-scale object 56 from the image background 58. The series of images are stored in temporary memory during processing. The biometric identification software application 12 may further present the identified borders 62 of the fingers 74 of the hand image 54 to show the borders 62 are properly identified and display the square 66 around the full-scale object 56 to be used to develop the reference element, as shown in FIG. 7A.

Processing may occur within seconds using the dimensions of the full-scale object to develop a reference element and various algorithms that may identify and calculate relationships between various measurements from the image of the four fingers 74 of the person's hand 54. As shown in FIG. 7B, parameters may be defined from the hand geometry in many different ways. As shown, parameters may be taken from measurements from the longest length of each finger L1-L4, from the sections between the knuckles of each finger S1-S8, or from the half finger line length of each finger D1-D8, for example. The parameters generated from the measurements are used to calculate ratios between different parameters as specified by one or more processing algorithms. An identification code may be constructed from a processing algorithm and one or more identification codes may be combined using encryption algorithms to create a biometric template.

Figure 8:
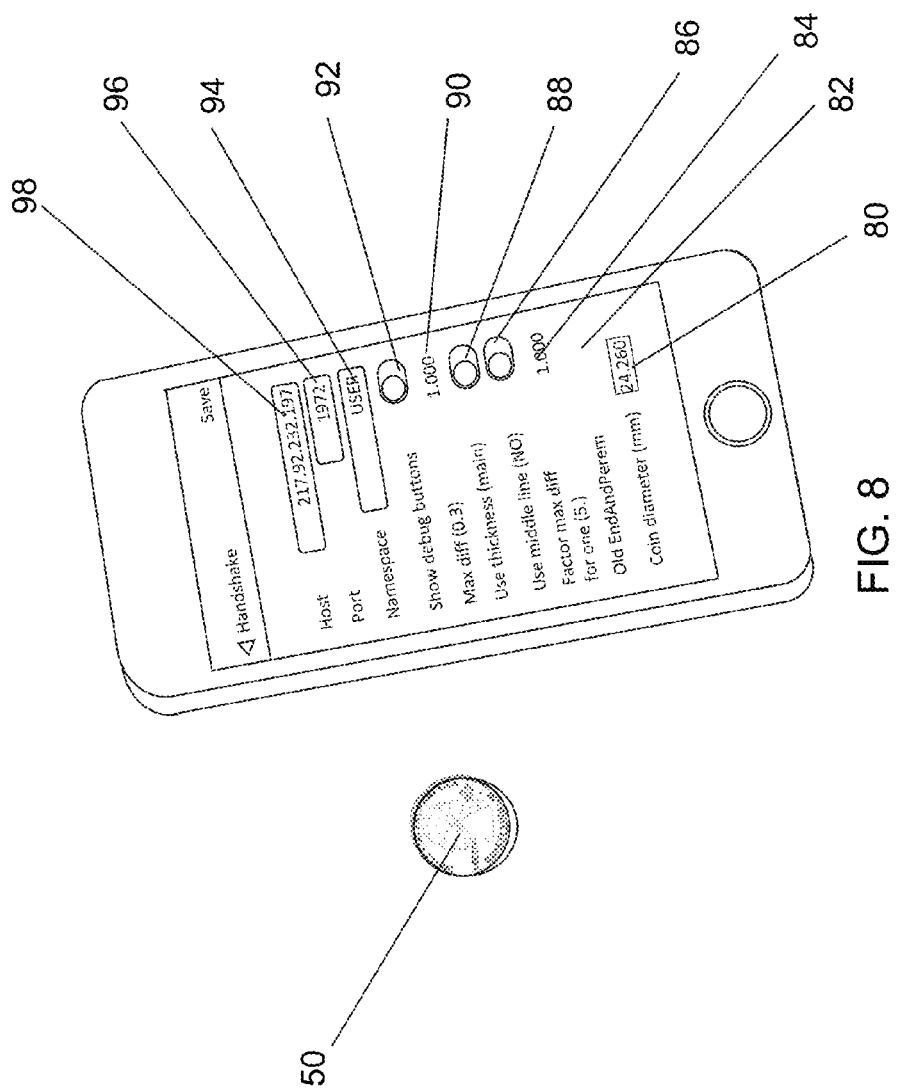
FIG. 8 is an embodiment of a data entry screen for entering dimensions of a full-scale object accessible through a biometric identification mobile app or software application in embodiments of the biometric identification system of the present invention.

After the image or series of images are captured, the user is prompted or may select a Dim option 71 to enter the dimensions of the full-scale object 50, such as by entering the diameter D of a round coin in a dimension dialog box 80 as shown in FIG. 8. Using the diameter of a coin, for example, provides a known dimension that is consistent with the diameter of any other coin of the same type and a coin of any size or denomination is an object that is readily available to a user. Options to identify the perimeter or end points 82 or additional comparative parameters for similarly dimensioned objects such as a maximum difference value 84 may be entered. Options for use of the middle line of the object 86 or the thickness 88 may be selected. Other options to set the border 64 or set other factors such as maximum difference 90 between the border 64 and image background 58 may be selected. Options to identify issues such as by showing debug buttons 92 may be selected and other information such as the user name 94, communication port 96, and/or the IP address 98 or other information may be available for the user to access and change as required.

Figure 9:
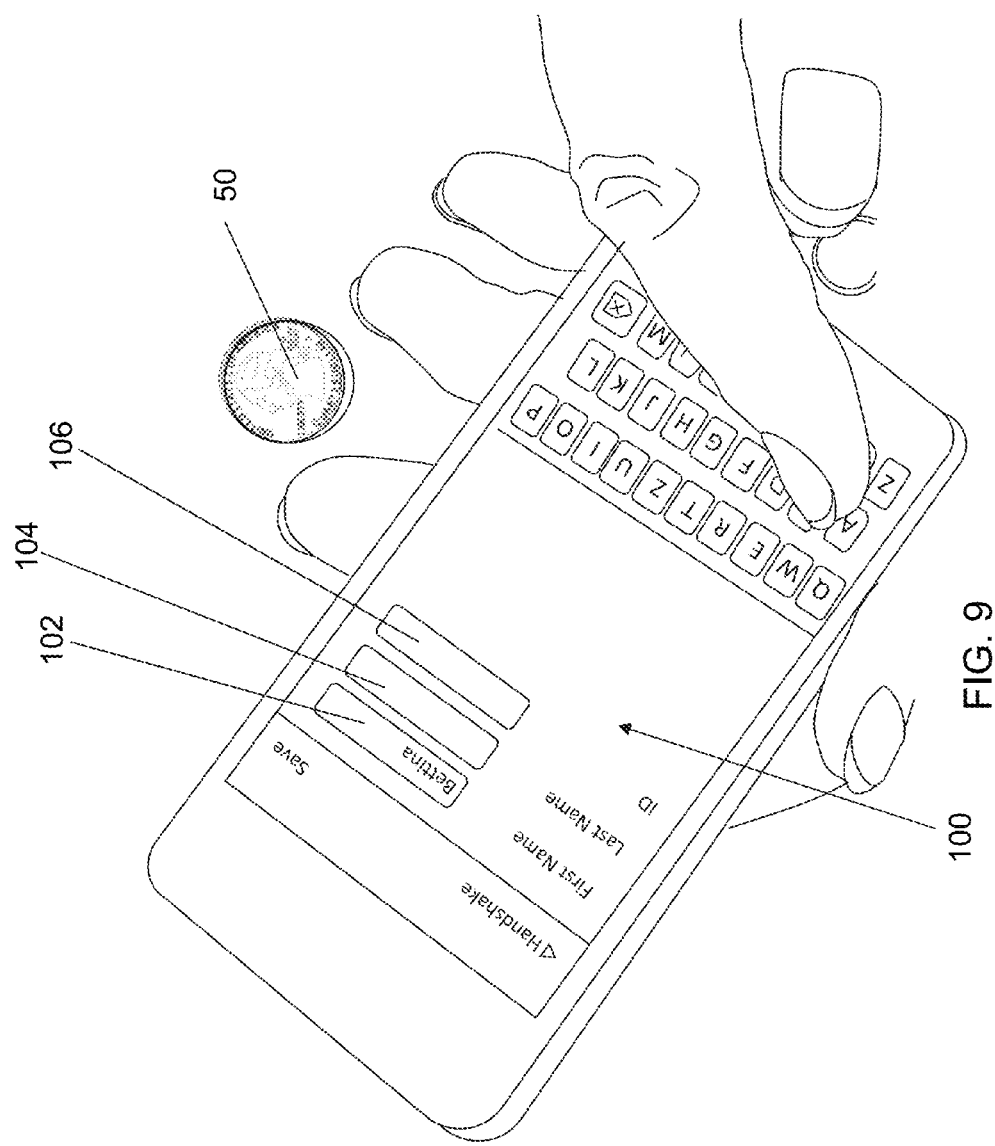
FIG. 9 is an embodiment of a user identification data entry screen accessible through a biometric identification mobile app or software application in embodiments of the biometric identification system of the present invention.
Figure 10:
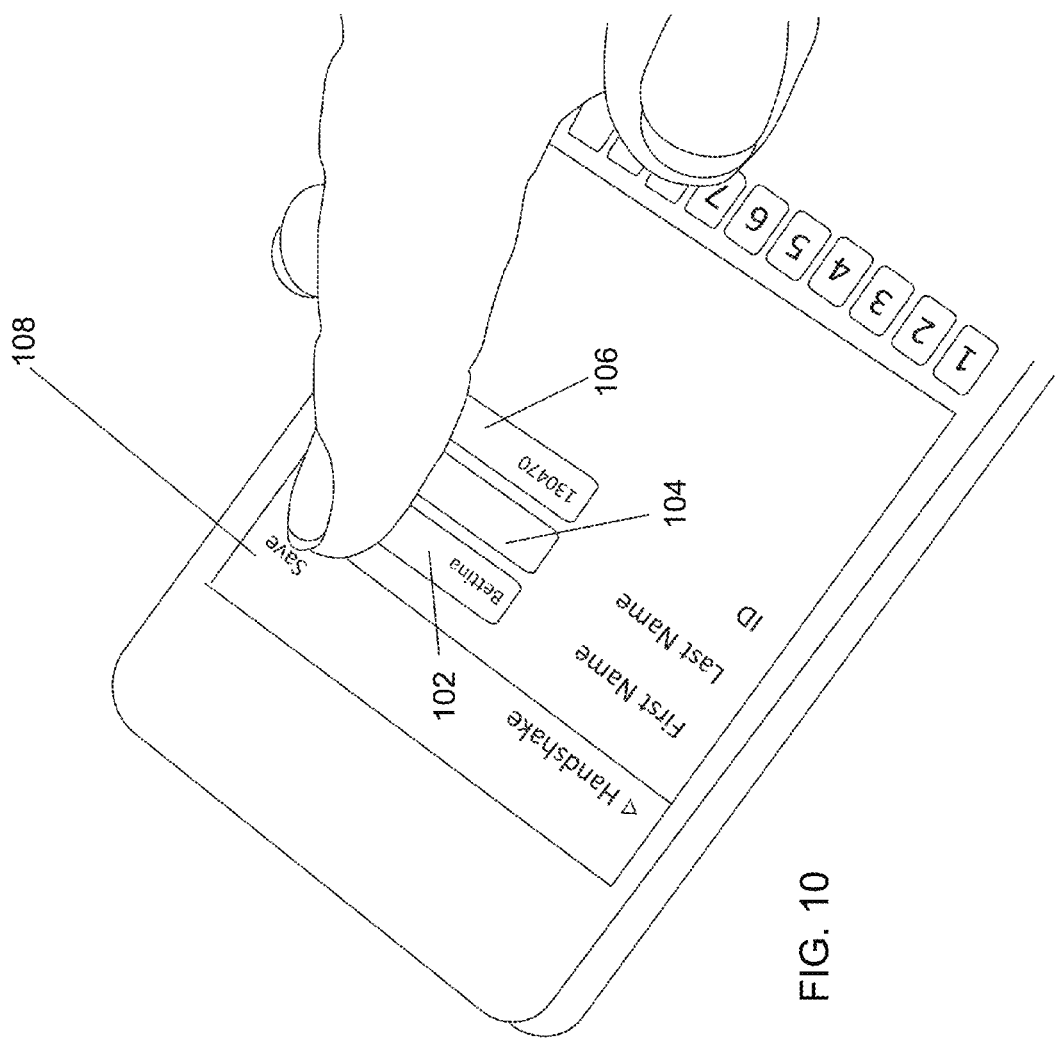
FIG. 10 is an embodiment of a user identification data entry screen accessible through a biometric identification mobile app or software application in embodiments of the biometric identification system of the present invention.
Figure 11:
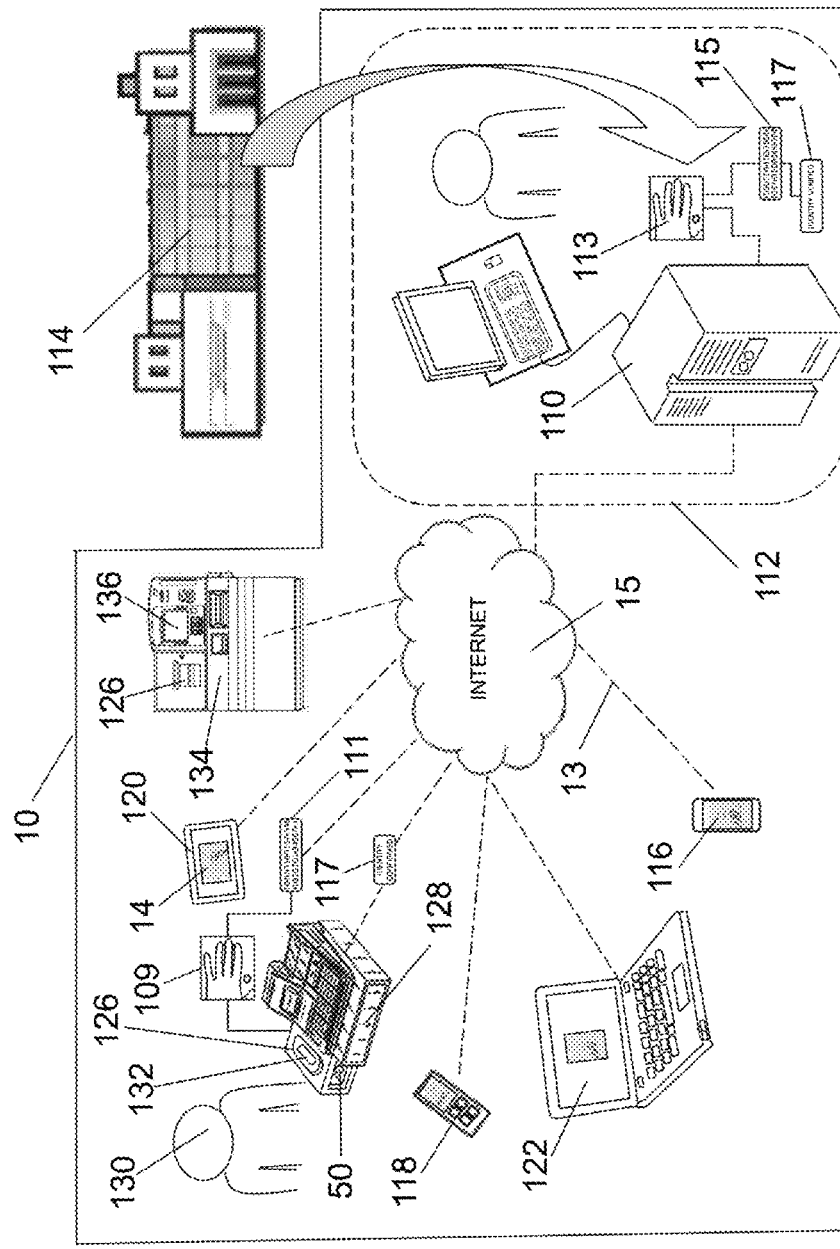
FIG. 11 is a diagram of an embodiment of the biometric identification system of the present invention.

In a data entry screen 100 of the biometric identification software application 12, the user may enter identifying information such as first name 102, last name 104, and identification number 106, as shown in FIGS. 9 and 10. The entered information is associated with the biometric template which is registered in the identification facilities biometric verification database. The series of images may be stored with the registered biometric template 115 and additional information such as login, password, email, address, employer information, bank or credit card account number may be entered and be encrypted and be transmitted with the biometric template to be securely stored within one or more biometric verification databases to facilitate a financial purchase or to perform other transactions requiring valid identification. To start the enrollment and registration of the user's biometric template 115 for verification of the user's identification, the user may select a Save button 108 to securely transmit the information to a server system 110 having one or more databases within the biometric identification system 10, as shown in FIG. 11. The registered biometric template 115 and enrollment information for the user which may include the series of images are stored in one or more verification databases within the server system 110 of the provider 112. The provider 112 may be a command center managing information for a financial institution 114, retail store, or other facilities requiring security protocols for access or authorization.

The biometric identification software application 12 may be implemented on a digital device such as a smartphone 116, a cellular phone 118, a tablet computer 120, and/or laptop computer 122 where the user may for example start, order, and/or authorize any financial transaction. By selecting identification 18 from the start screen 14 a person may for example authorize a purchase from a website by verifying their identity when placing an online order through a payment service such as Apple Pay, Google Wallet—Android Pay, Alibaba—Alipay, PayPal, Samsung—LoopPay, Samsung—Android Pay, or others. In other embodiments, the biometric identification system 10 may be implemented through a standalone or integrated device that incorporates the biometric identification software application 12, camera 32, and internet connection to transmit a newly acquired biometric template 111 to the central database 110 of the provider 112 for validation. For example, the biometric identification device 126 may be integrated with a cash register 128 so the identity of a person may be verified when making for example a credit card purchase. For verification, the user 130 must simply insert their hand within the device 126 that has the full-scale object 50 installed within the frame where the newly acquired image 109 of the user's hand 40 will be taken. Identification codes are created using processing algorithms that specify parameters calculated from the geometric measurement of the person's hand. One or more identification codes are stored within a newly acquired biometric template 111. The device 126 transmits a newly acquired biometric template 111 to the provider 112 and a comparison of the one or more identification codes created from an earlier taken image 113 and that have been stored in a registered biometric template 115 are made. If there is a precision match of the newly acquired biometric template 111 to the registered biometric template 115 then an identification verification 117 is transmitted to the biometric identification device 126. If any identification code is outside of a statistical tolerance, then the newly acquired biometric template will not match the registered biometric template 115 and error or incorrect identification notice will be transmitted. The notification of a confirmed or false identity of the person is provided within a display or by using an indicator 132.

The notification may be presented using any appropriate type of indicator 132 on the device such as a light blinking, or turning on or off, a sound, and/or other electronic signal or message display that verifies the person's identity and authorizes the retail or financial institution 114 to complete the transaction or notifies the retail or financial institution of a false identity and the transaction is denied. In further embodiments, the biometric identification device 126 may be integrated with an ATM machine 134, a self-service machine, a parking machine, or other equipment to start any financial transaction, place an order from the equipment, and/or authorize a transaction such as when depositing or more particularly when making a withdrawal of cash from the ATM machine 134. The user 130 inserts their ATM debit card or credit card, or use their mobile device to initiate the transaction and then inserts their hand into the biometric identification device 126 and requests a transaction. The user's identity is verified by transmitting the newly acquired biometric template 111 to the central database 110 of the provider 112 within the biometric identification system 10 where a comparison of the registered biometric template 115 is made to the newly acquired biometric template 111 and if a precision match within a statistical tolerance is verified a notification to the biometric identification device 126 is transmitted confirming the identity of the person. The notification may be presented using an indicator within the display 136 of the ATM 134 such as using a statement "Identification Verified. Transaction Authorized" or another indicator or electronic signal to allow the financial transaction to be completed.

Figure 12:
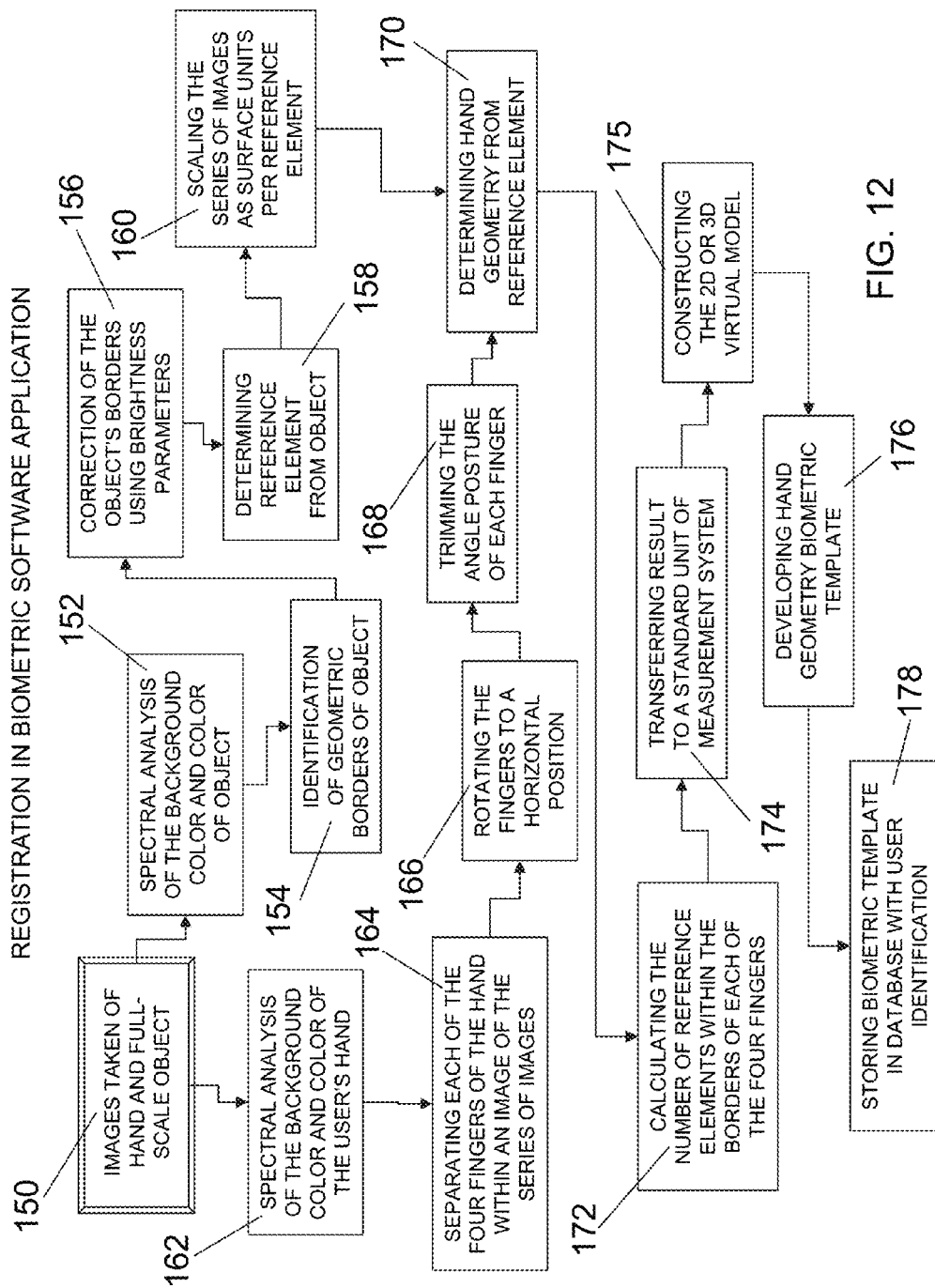
FIG. 12 is a flow chart of the steps to register a biometric template in an embodiment of the biometric identification system of the present invention.
Figure 13:
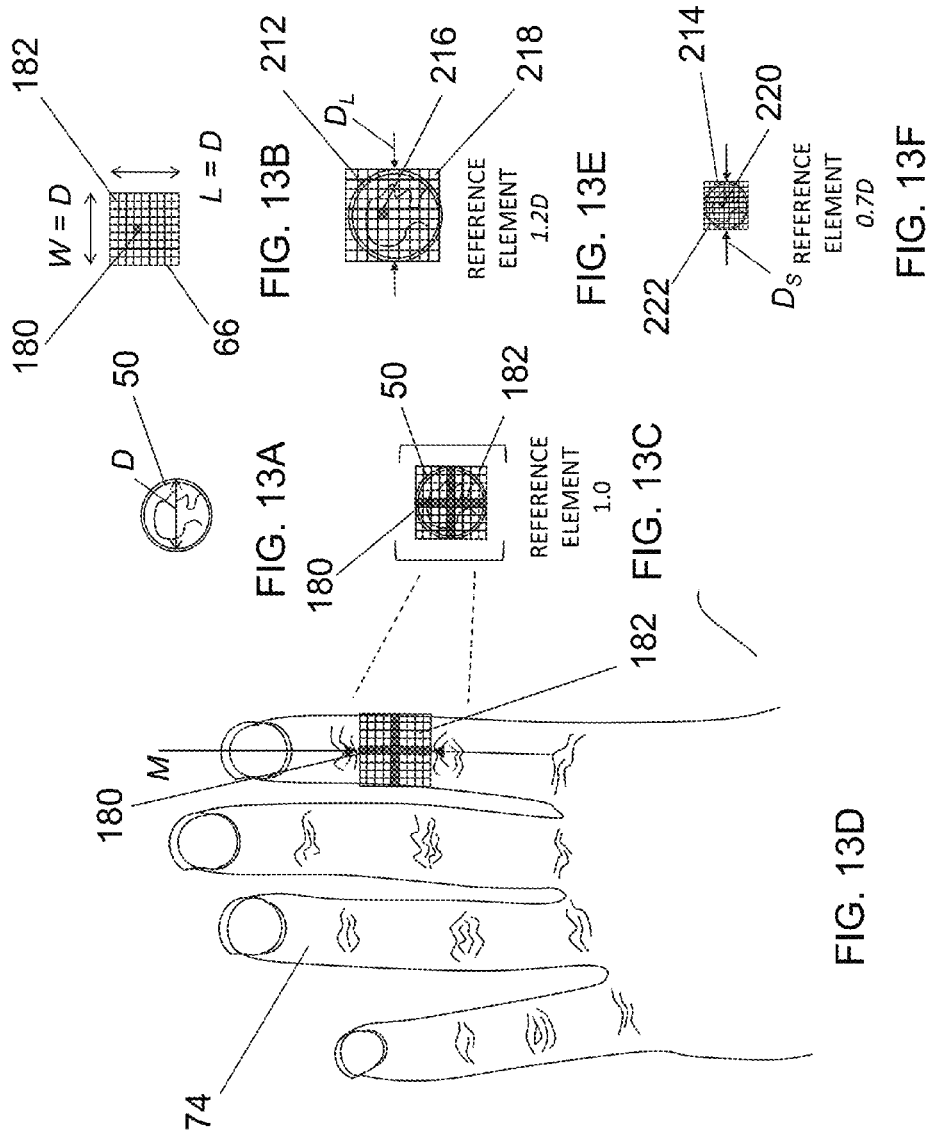
FIG. 13A is a diagram of an embodiment of a full-scale object used in an embodiment of the biometric identification system of the present invention.
FIG. 13B is a diagram of an embodiment of a reference element defined within a grid derived from the dimensions of the full-scale object in an embodiment of the biometric identification system of the present invention.
FIG. 13C is a diagram of an embodiment of reference elements defined within a grid with the full-scale object in an embodiment of the biometric identification system of the present invention.
FIG. 13D is a diagram of an embodiment of an image of a person's hand and a reference element defined within a grid used in an embodiment of the biometric identification system of the present invention.
FIG. 13E is a diagram of an embodiment of reference elements defined within a grid with the full-scale object in an embodiment of the biometric identification system of the present invention.
FIG. 13F is a diagram of an embodiment of reference elements defined within a grid with the full-scale object in an embodiment of the biometric identification system of the present invention.

As shown in FIG. 12, the steps for registration and construction of the 2D or 3D virtual model from the series of images of the hand or face with the full-scale object 56 include a number of processing steps. The initial step is the capturing of the series of images 150 to begin the analysis of the images using the processing algorithms of the biometric identification software application 12. Spectral analysis is performed on the images iteratively with the analysis of a first image and then validation of the measured geometry of the person's hand through a similar analysis on each subsequent image and then an averaging and range is determined which may be used to set tolerances to validate the comparison between a newly acquired biometric template 111 and a registered biometric template 115. The processing steps may begin with an analysis of the full-scale object within the series of images at step 152 and the geometric borders of the full-scale object are identified within each image at step 154. Using focal adjustments, brightness parameters, and photographic enhancement features as prescribed by the algorithms of the biometric identification software application 12, the image of the object's borders 62 are corrected to clearly separate the image of the full-scale object from the background of the image at step 156. Once the borders 62 of the image of the full-scale object 56 are clearly defined, and the dimension or dimensions of the full-scale object are entered the reference element is determined at step 158. For example, if the object is round, a single dimension the diameter D of object 50 may be entered, as shown in FIG. 13A. To determine the reference element a square is drawn around the image of the full-scale object 56 with each side of the square being equal to the known diameter D. The square 66 is then divided into equal portions along the length L of the square 66 and the width W of the square 66 to determine the reference element 180 that is the size of one square formed from the grid 182 of equal divisions as shown in FIG. 13B. If the full-scale object is square, rectangular, triangular or another shape, the appropriate dimensions are entered to develop a grid 182 having equally sized reference elements 180. The reference element 180 as defined within the series of images at step 158 is therefore based on the actual dimensions of the full-scale object 50 so that the reference element 180 may be used as a unit of measure similar to pixels of equal dimension, as shown in FIG. 13C to measure actual distances within the surface area of an image and the series of images may be scaled to the reference element 180 at step 160 in FIG. 12.

At step 162, spectral analysis including focal adjustments, brightness parameters, and other photographic enhancement features using the processing algorithms of the biometric identification software 12 is performed on an image 60 within the series of images to analyze and identify the color of the person's hand 54 within an image 60 and the color of the image background 58 within the image 60. From this analysis, the four fingers 74 within the image 60 of the person's hand 54 are separated from the image background 58 and the borders 62 around each of the fingers is defined at step 164. The image 60 is then rotated to align the image 60 and fingers 74 in a horizontal position at step 166. Through a gradient analysis of color within the image 60 the angle posture of each finger 74 is trimmed at step 168 to flatten and minimize the borders 62 to clearly define the edge of each finger 74 within the image 60. Once the borders 62 are defined, the reference element 180 is used to determine parameters and relationships of the geometry of the fingers 74 and/or hand 54 of the user within the image 60 at step 170. Specific parameters and relationships are defined by the processing algorithms of the biometric identification software application 12 and may be varied and encoded. For example, the central database 110 of the provider 112 within the biometric identification system 10 may after an initialization is transmitted from the biometric identification device 126, transmit processing algorithms that define the required parameters that should be taken from the measurements within the newly acquired images 109 to develop one or more identification codes to be transmitted in the newly acquired biometric template 111 that is then compared to the registered biometric template 115. In this manner, the defined parameters within the encrypted processing algorithms may be continually changed preventing copying or theft of identity or attempts to provide false identification.

To acquire the measurements that are used in calculating the parameters, the actual size of each of the fingers is determined from the number of reference elements within the defined borders of the geometry of the hand in the series of images at step 172. As shown with a partial grid 182 in FIG. 13D, any and/or all distances such as the distance between features of the finger indicated as M may be measured within a grid 182 using the reference element 180 as units of measure and because the reference element 180 is determined from an actual dimension of the full-scale object 50, the unit may be defined or converted to any standard measurement units such as millimeters at step 174.

Because each of the features of the geometry of a person's hand and relationships of the features are unique to that person, the measurements of the image of the hand 54 are used to construct a unique two dimensional (2D) virtual model using the length and width as two dimensions or a three dimensional (3D) virtual model of the hand using the length, width and the angle posture of each finger and edge of the hand as a third dimension at step 175. A unique newly acquired biometric template 111 is derived from one or more parameters that define relationships of the features within the geometry of the person's hand based on the parameters defined by the processing algorithms of the biometric identification software 12. These relationships are uniquely associated with the hand 40 of that person providing clear proof of the identification of that person. The defined parameters are converted to one or more identification codes from the measured geometric features which are stored within a biometric template at step 176 particular to that person. A registered biometric template 115 may be encrypted with the person's identity and be stored within a central database 110 of a security provider 112 at step 178.

Figure 14:
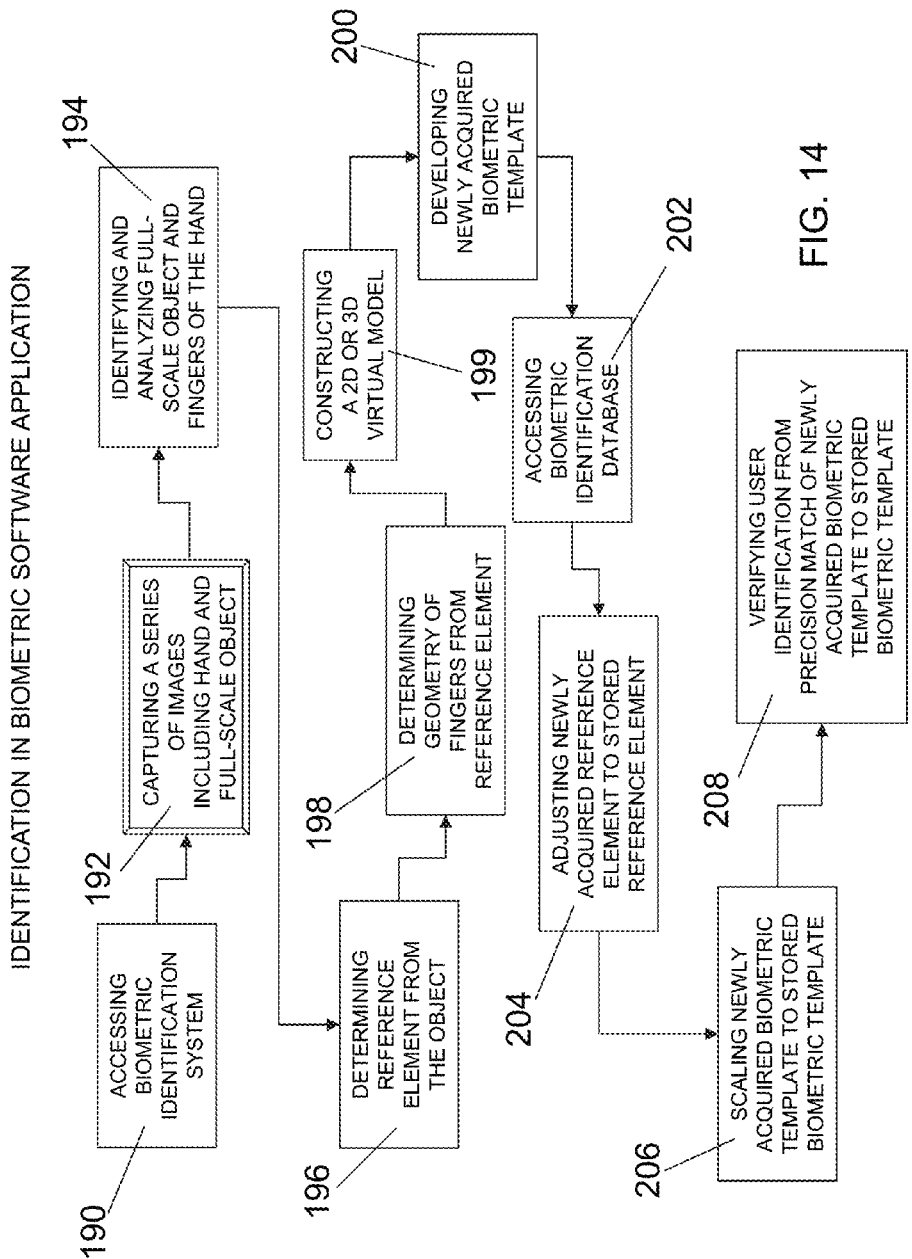
FIG. 14 is a flow chart of the steps to identify a person from a biometric template in an embodiment of the biometric identification system of the present invention.

As shown in FIG. 14, the person's identification is verified through a series of steps, the initial step being accessing the biometric identification system 10 which may be through the biometric identification mobile app or other software application 12 on a mobile device, through a standalone or integrated device within a kiosk, an ATM, a cash register at point of sale, a laptop or other home computer, or using other digital devices at step 190. Using the digital device, the step of capturing a newly acquired series of images is performed at step 192. The series of images are analyzed at step 194 using focal adjustments, brightness parameters, and other photographic enhancement features of the spectral analysis algorithms of the biometric identification software application 12 to separate the background of the image from the full-scale object and from the person's hand or face as described above. A reference element 180 is derived from the dimensions entered by the user of a full-scale object 212 at step 196 that as shown in FIG. 13E, may be larger than the initial full-scale object 50 used to create the registered biometric template 115 or may be a full-scale object 214 that is smaller than the initial full-scale object 50 as shown in FIG. 13F. Whether the diameter $D_L$ of the full-scale object 212 is longer or the diameter $D_S$ of a full-scale object 214 is shorter, the entered diameter $D_L$ or $D_S$ are linear percentages of the length of the diameter D of the registered full-scale object 50, and therefore because the reference element 180 is derived from the diameter D if the full-scale object is round as a single linear measurement that is applied as the length and width of the square 66 surrounding the full-scale object 50, the reference element 216 of the larger full-scale object 212 may be scaled to a smaller size by using the biometric identification software application 12 and calculating the percentage of the diameter $D_L$ to the registered diameter D shown as 1.2D for the newly acquired reference element 216 shown in FIG. 13E and 0.7D for the newly acquired reference element 220 shown in FIG. 13F to have precise measurements determined from the newly acquired image to accurately identify the geometry of the person's hand and precisely calculate parameters that will be used in one or more identification codes to match the geometry measured within the newly acquired biometric template 111 to the registered biometric template 115 to verify the person's identity. In this manner, a user may use any object of any size and/or shape that has a known dimension. For example, a user may use a round object with a known diameter and the software will use the diameter to determine the derived reference element that is scaled to the reference element 180 of the registered biometric template 111. In a further example, a standalone biometric identification device 126 may have a full-scale object 50 permanently installed within the area where the user inserts their hand to capture the newly acquired image. The user may therefore both initially register their biometric identification template 111 and then subsequently verify their identity using the standalone biometric identification device 126 without a requirement that the user at any time provide the full-scale object 50 or enter any dimensions of the full-scale object.

In continuing with the steps for the verification of the identification of the user, the geometry of the fingers and/or hand of the user is determined using the biometric identification software application 12 at step 198, and from these measurements a 2D or 3D virtual model is constructed at step 199 as shown in FIG. 14. The newly acquired biometric template 111 is developed at step 200. The biometric identification database 110 is accessed at step 202 which may be accessible within an internal network to verify identification of employees within a company or to prevent unauthorized access within a secure organization, or the biometric identification database 110 may be at a command center within a separate facility and accessible through a wired or wireless internet connection.

The newly acquired biometric template 111 may be adjusted such as using brightness parameters or other photographic enhancement features and image correction algorithms of the biometric identification software application 12 at step 204 and as noted above, the newly acquired biometric template may be scaled to the registered biometric template 115 based on any differences in the dimensions of the newly acquired full-scale object and the dimensions of the full-scale object 50 used for registration at step 206. At step 208 comparisons of one or more identification codes developed from parameters defined by processing algorithms of the biometric identification software application 12 are made between the registered biometric template 115 and the newly acquired biometric template 111 and only a precision match of the newly acquired biometric template 111 to the registered biometric template 115 allows a verification and notification of a confirmed identity of the person.

Figure 16:
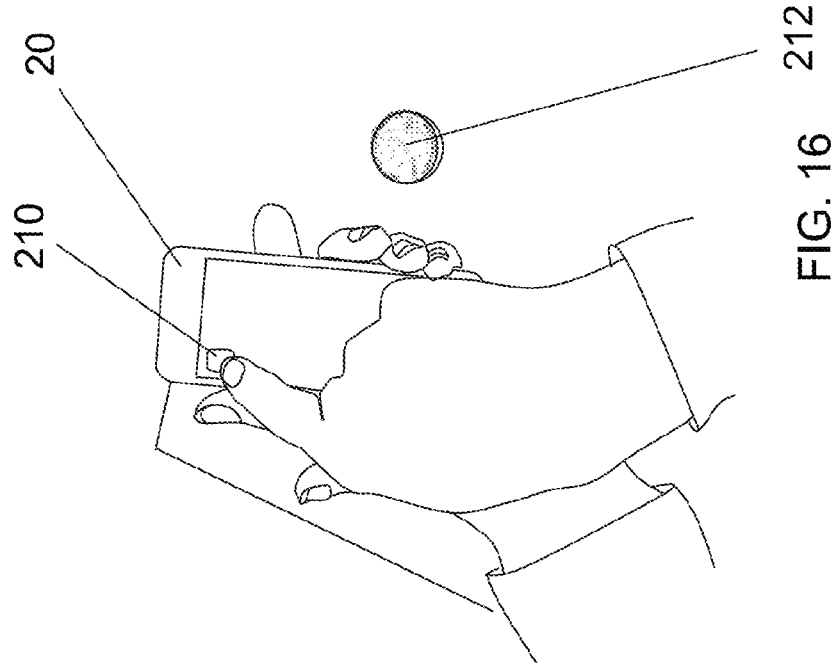
FIG. 16 is a full-scale object and icon to access an embodiment of the biometric identification system of the present invention.
Figure 15:
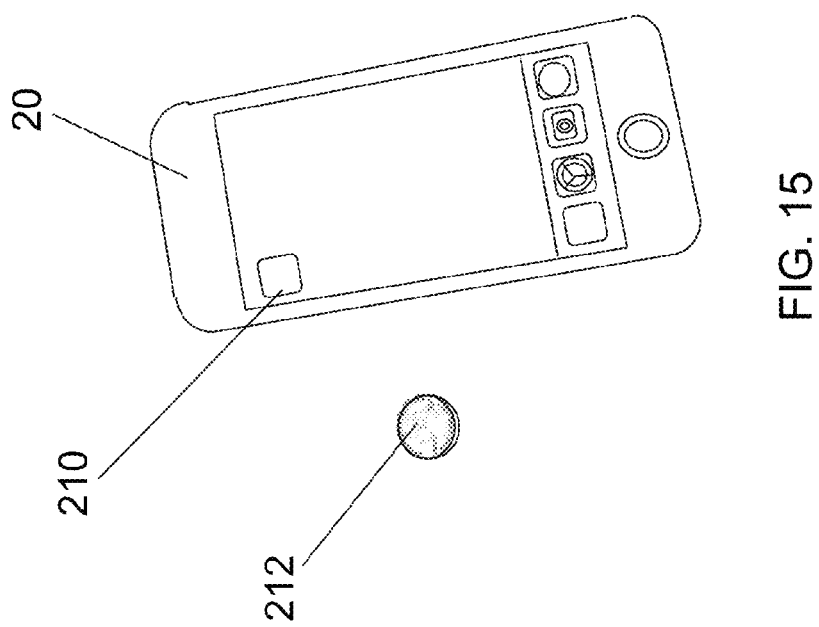
FIG. 15 is a full-scale object and icon to access an embodiment of the biometric identification system of the present invention.
Figure 17:
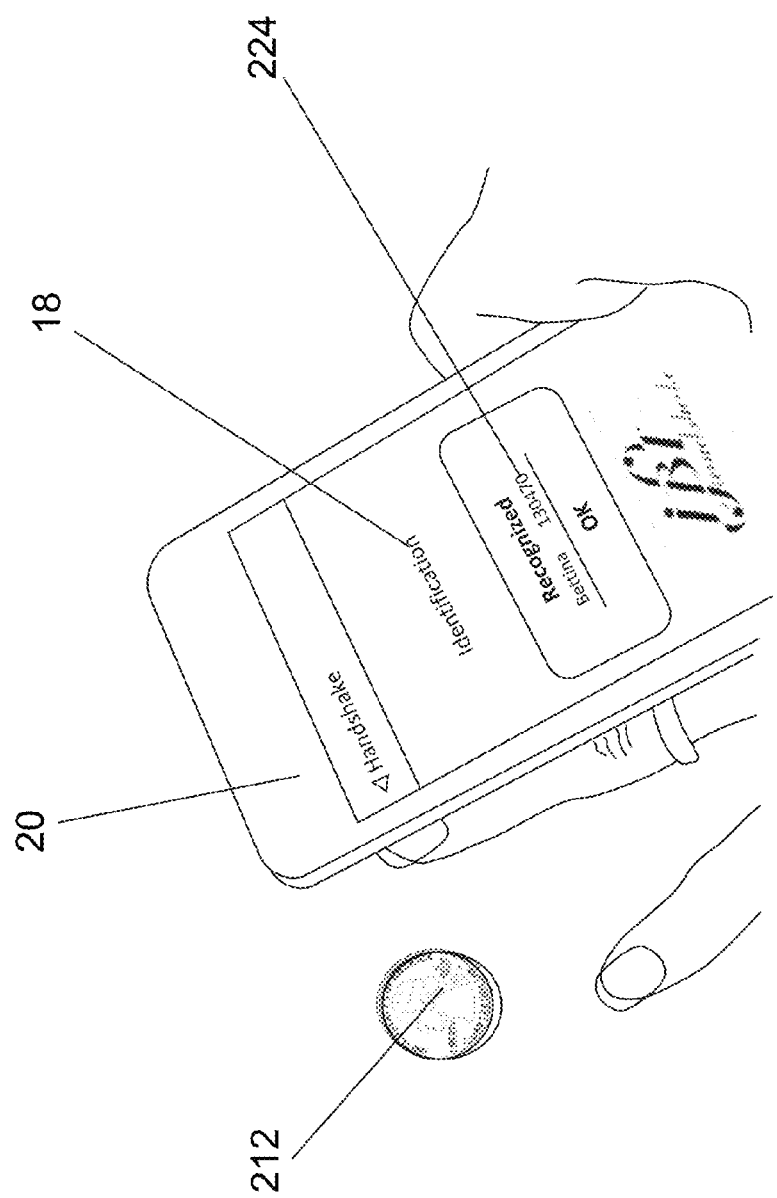
FIG. 17 is an embodiment of a verification of identity screen in an embodiment of the biometric identification system of the present invention.

In an embodiment, as shown in FIG. 15, for the user to perform a verification of identity to confirm for example a financial transaction of an internet or retail purchase, the user gets a full-scale object 212 and their mobile device 20. The user selects the biometric identification software application 12 icon 210, as shown in FIG. 16, and is prompted to register their identification or to validate their identification. The user then selects the identification option 18 which processes the newly acquired series of images, constructs a 2D or 3D virtual model, generates identification codes based on defined parameters from the processing algorithms and creates a newly acquired biometric template 111. The newly acquired biometric template 111 is automatically transmitted or the user selects to transmit the newly acquired biometric template 111 to the biometric identification system database 110 for verification. As shown in FIG. 17, an identity indicator 224 is displayed if there is a precision match of the newly acquired biometric template 111 to the registered biometric template 115 meaning that the identity of the person is verified which authorizes the financial transaction or may permit access to a secure location, access to a device or website.

Figure 18:
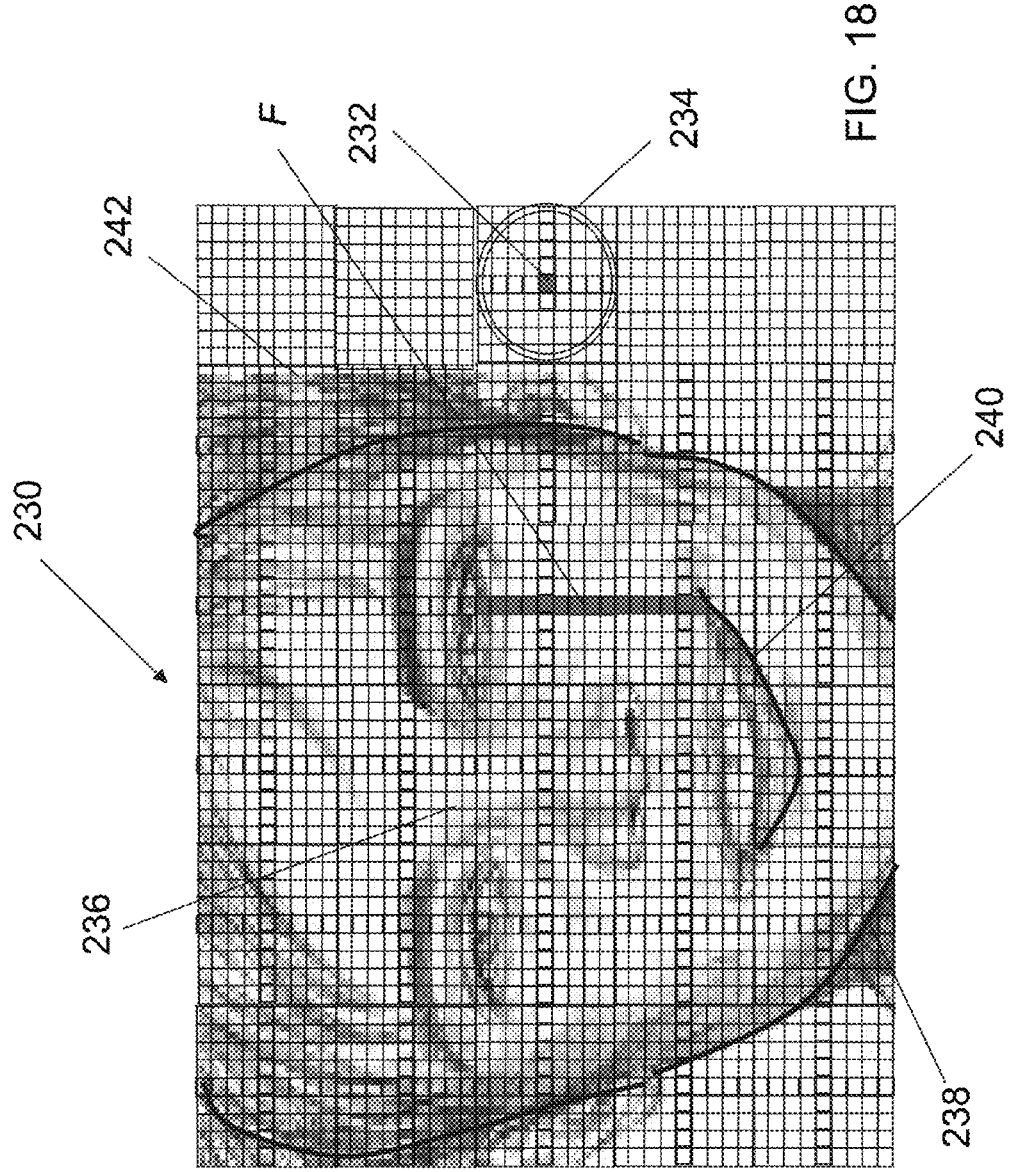
FIG. 18 is a diagram of an embodiment of an image of a person's face with the full scale object and reference elements defined within a grid used in an embodiment of the biometric identification system of the present invention.

The biometric identification system 10 may similarly be used to improve facial recognition algorithms through the construction of a 2D or 3D virtual model and the precise measurement and comparison of geometric features and the relationship of these features of the face to a reference element 232 derived from a full-scale object 234 of known dimensions. Similarly, to the taking of the series of images of a person's hand with the full-scale object, a full-scale object is positioned within the series of images of a person's face 236, as shown in FIG. 18. Spectral analysis, photographic enhancement, and gradient analysis of color within each image 230 to trim the angle posture of the borders 238 and particular features 240 of the image 230 of the person's face 236 is performed using the biometric identification software application 12. From the grid 242 extended across the image 230, the reference element 232 is used to measure distances between features such as the features from the lips of the mouth to the eye indicated as F and numerous other features to construct a 2D or 3D virtual model that defines the geometry of the face of the person which may be converted to identification codes based on defined parameters from the processing algorithms of the biometric identification software which may be stored with the series of images as a registered biometric template 115 or be temporarily stored and time stamped as a newly acquired biometric template 111. The use of a full-scale object 234 within the same image of a person's face may assist in more precise identification of features that may lead to faster and more verifiable identification of a person through comparison to the stored registered biometric template within the biometric identification system 10.

Although specific embodiments of the invention have been disclosed herein in detail, it is to be understood that this is for purposes of illustration. This disclosure is not to be construed as limiting the scope of the invention, since the described embodiments may be changed in details as will become apparent to those skilled in the art in order to adapt the biometric identification system to particular applications, without departing from the scope of the following claims and equivalents of the claimed elements.

What is claimed is:

1. A biometric identification system, comprising:
   a software application executed on a microprocessor having memory and data storage on a digital device comprising instructions;
   at least one image comprising a person's hand or face and; a full-scale object;
   a reference element comprising determining the border of the full-scale object within the image, drawing a square around the full-scale object and developing a grid of equal sized units from the full-scale object;
   at least one identification code constructed by determining the borders of geometric features of the hand or face within the image and determining parameters from measurements of the geometric features using the reference element;
   a registered biometric template comprising the identification of the person and at least one identification code;
   a newly acquired image comprising a person's hand or face and a full-scale object;
   a newly constructed reference element comprising determining the border of the full-scale object within the newly acquired image, drawing a square around the full-scale object within the newly acquired image and developing a grid of equal sized units from the full-scale object within the newly acquired image;
   at least one identification code constructed by determining the borders of geometric features of the hand or face within the newly acquired image and determining parameters from measurements of the geometric features using the newly constructed reference element;
   a newly acquired biometric template comprising at least one identification code constructed from the newly acquired image; and
   a notification confirming the identity of the person as true or false by comparing the newly acquired biometric template to the registered biometric template.

2. The biometric identification system of claim 1 wherein the software application comprising spectral analysis components.

3. The biometric identification system of claim 1 wherein the software application comprising gradient analysis components.

4. The biometric identification system of claim 1 wherein the software application comprising photographic enhancement components.

5. The biometric identification system of claim 1 comprising dimensions of the full-scale object and using these dimensions to construct the reference elements, using the reference elements to construct a three dimensional virtual model comprising the actual dimensions of the geometric features of a person's hand or face.

6. The biometric identification system of claim 1 wherein the software application comprising a dialog box to enter the identification of the person; and
   image capture controls of the software application operate at least one camera of the digital device.

7. The biometric identification system of claim 1 wherein identification codes are constructed by determining ratios between the parameters of the measurements from the geometric features of a person's hand or face using the reference element.

8. The biometric identification system of claim 1 comprising a database for storing a plurality of registered biometric templates, with each having the identification of a person and at least one identification code, the identification of a person, the identification codes and the biometric templates being encrypted.

9. The biometric identification system of claim 8 comprising an identification verification component to access the database to determine a precision match with one of the plurality of biometric templates within the database with a newly acquired biometric template to verify the identification of a person.

10. The biometric identification system of claim 9 wherein the newly acquired biometric template is time-stamped in order to use the newly acquired biometric template only once in a comparison with the biometric template within the database.

11. The biometric identification system of claim 1 comprising an orientation indicator accessing tilt sensor data from the digital device to reproducibly align the camera lens by adjusting the orientation indicator to align on a cross point of a horizontal axis and a vertical axis.

12. A method of verifying the identification of a person, comprising:
   acquiring at least one image of a person's hand or face, the at least one image including a full-scale object;
   acquiring dimensions of the full-scale object;
   deriving a reference element from the dimensions of the full-scale object;
   scaling the at least one image to the reference element to determine the actual dimensions of features of the person's hand or face within the at least one image;
   determining the geometric dimensions of the person's hand or face;

developing a registered biometric template from the determined geometric dimensions of the person's hand or face and the person's identification;
acquiring at least one new image of a person's hand or face, the at least one new image including a full-scale object;
acquiring dimensions of the full-scale object within the new image;
deriving a reference element from the dimensions of the full-scale object within the new image;
scaling the at least one new image to the reference element to determine the actual dimensions of features of the person's hand or face within the new image;
determining the geometric dimensions of the person's hand or face;
developing a newly acquired biometric template from the determined geometric dimensions of the person's hand or face within the new image;
verifying the identity of a person by comparing the registered biometric template to the newly acquired biometric template.

13. The method of verifying the identification of a person of claim 12 comprising constructing a virtual model of a person's hand or face from the actual geometric dimensions of features of the person's hand or face within the at least one image.

14. The method of verifying the identification of a person of claim 12 comprising defining parameters calculated from relationships of the geometric dimensions of the person's hand or face; and
storing these parameters within the registered and newly acquired biometric templates as at least one identification code.

15. The method of verifying the identification of a person of claim 12 comprising storing a plurality of registered biometric templates in a database.

16. The method of verifying the identification of a person of claim 15 wherein the newly acquired biometric template from at least one newly acquired image comprises identification codes constructed by determining the borders of features of the hand or face within the newly acquired image and determining parameters from measurements of the features using the reference element.

17. The method of verifying the identification of a person of claim 16 comprising comparing the newly acquired biometric template to the plurality of registered biometric templates within the database to determine a precision match and verify the identification of a person.

18. The method of verifying the identification of a person of claim 12 comprising registering at least one biometric template in a database within a command center.

19. The method of verifying the identification of a person of claim 12 comprising:
accessing tilt sensor data from a digital device;
displaying an orientation indicator on a display screen of the digital device based on the tilt sensor data;
moving the digital device to align the orientation indicator on a cross point of a horizontal axis and a vertical axis within the display screen;
capturing an image when the orientation indicator is on the cross point indicating the deflection of the digital device in the X, Y and Z axes is zero.

20. A non-transitory computer-readable medium for instructions for a biometric identification system, comprising:
instructions for operation of a camera on a mobile device to capture an image of a person's hand or face with a full-scale object within the image;
instructions for receiving dimensions of the full-scale object;
instructions for deriving a reference element from the dimensions of the full scale object;
instructions for measuring the geometry of a person's hand or face within the image using the reference element;
instructions for defining at least one parameter from measurements of the person's hand or face within the image using the reference element;
instructions for generating at least one identification code from the defined parameters;
instructions for generating a registered biometric template from the identification of the person and at least one identification code;
instructions for capturing a new image of a person's hand or face with a full-scale object;
developing a newly acquired biometric template from identification codes constructed from the new image; and
instructions for determining the identification of a person from a comparison of the registered biometric template to the newly acquired biometric template.

21. The non-transitory computer-readable medium for instructions for a biometric identification system of claim 20, comprising:
instructions for using a newly acquired biometric template only once in a comparison to a registered biometric template for identification.

22. The non-transitory computer-readable medium for instructions for a biometric identification system of claim 20, comprising:
instructions to access tilt sensor data from a digital device;
instructions to display an orientation indicator on a display screen of the digital device based on the tilt sensor data;
instructions to display the orientation indicator on a cross point of a horizontal axis and a vertical axis when the tilt sensor data indicates zero deflection in the X, Y and Z axes;
capturing an image when the orientation indicator is on the cross point indicating the deflection of the digital device in the X, Y and Z axes is zero.

* * * * *